(12) United States Patent
Way

(10) Patent No.: US 6,895,184 B2
(45) Date of Patent: May 17, 2005

(54) INTERCONNECTED BROADCAST AND SELECT OPTICAL NETWORKS WITH SHARED WAVELENGTHS

(75) Inventor: Winston Way, Irvine, CA (US)

(73) Assignee: OpVista, Inc., Irvine, CA (US)

( * ) Notice: Subject to any disclaimer, the term of this patent is extended or adjusted under 35 U.S.C. 154(b) by 229 days.

(21) Appl. No.: 09/990,196

(22) Filed: Nov. 21, 2001

(65) Prior Publication Data

US 2002/0067523 A1 Jun. 6, 2002

Related U.S. Application Data

(63) Continuation of application No. 09/575,811, filed on May 22, 2000.
(60) Provisional application No. 60/309,220, filed on Jul. 31, 2001.

(51) Int. Cl.[7] .............................................. H04B 10/20
(52) U.S. Cl. .................... 398/59; 398/3; 398/4
(58) Field of Search ........................ 398/3, 4, 59, 79, 398/82, 83, 84, 85

(56) References Cited

U.S. PATENT DOCUMENTS

| 5,301,058 | A |   | 4/1994  | Olshansky ............... 359/188 |
| 5,333,000 | A |   | 7/1994  | Hietala et al. ........... 342/368 |
| 5,596,436 | A |   | 1/1997  | Sargis et al. ............ 359/132 |
| 5,712,716 | A | * | 1/1998  | Vanoli et al. ............. 398/34 |
| 5,745,273 | A |   | 4/1998  | Jopson .................. 359/181 |
| 5,870,212 | A | * | 2/1999  | Nathan et al. ............. 398/4 |
| 5,949,560 | A |   | 9/1999  | Roberts et al. .......... 359/110 |
| 5,982,963 | A |   | 11/1999 | Feng et al. ............... 385/37 |
| 6,008,931 | A |   | 12/1999 | von Helmolt et al. ..... 359/326 |
| 6,118,566 | A |   | 9/2000  | Price .................... 359/181 |
| 6,130,766 | A |   | 10/2000 | Cao ..................... 359/161 |
| 6,163,553 | A |   | 12/2000 | Pfeiffer .................... 372/6 |
| 6,192,173 | B1 |  | 2/2001  | Solheim et al. ........... 385/24 |
| 6,351,323 | B1 |  | 2/2002  | Onaka et al. ............. 385/24 |
| 2002/0015553 | A1 | | 2/2002  | Claringburn et al. ...... 385/24 |

FOREIGN PATENT DOCUMENTS

WO    WO 9632787 A1 * 10/1996    ......... H04B/10/213

* cited by examiner

Primary Examiner—M. R. Sedighian
Assistant Examiner—Christina Y. Leung
(74) Attorney, Agent, or Firm—Fish & Richardson P.C.

(57) ABSTRACT

These and other objects of the present invention are achieved in a method of transmitting optical signal traffic. An all optical network is provided with at least two rings that are geographically dispersed. Each ring includes at least one transmitter and at least one receiver. The available wavelengths are separated into distinct ring bands. The optical signal traffic is shared throughout the entire optical network. Each ring is provided with its own distinct ring band of the optical signal traffic. All of the optical signal traffic is transmittable throughout the optical network. Each receiver is configured to receive only wavelengths in a ring band designated for its associated ring.

70 Claims, 22 Drawing Sheets

INTERCONNECTED BROADCAST AND SELECT OPTICAL NETWORKS WITH SHARED WAVELENGTHS

CROSS-REFERENCE TO RELATED APPLICATIONS

This application claims the priority of U.S. Application No. 60/309,220, filed Jul. 31, 2001.

BACKGROUND OF THE INVENTION

1. Field of the Invention

The present invention relates generally to all optical networks, and more particularly to an all optical network that has a break point in a hub of a ring that becomes closed when a new break point is created in the network.

2. Description of the Related Art

In today's long-haul dense-wavelength-division-multiplexed (DWDM) optical networks, multiple regenerators have been replaced by optical amplifiers. However, when interconnecting two or more metro ring networks, or when interconnecting a metro ring with long-haul systems, telecom operators are still relying on regenerators and O-E-O wavelength-converters. Wavelength-converters are needed because conventional DWDM systems do not possess enough wavelengths to cover a wide service area such as multiple interconnected rings, and therefore wavelengths used in one ring must be re-used in another ring via wavelength converters. Regenerators are needed because most of the transmission technologies used in today's metro networks can only support limited transmission distance and data rates.

Conventional ring networks, illustrated in FIGS. 1(a) and 1(b) have a central hub which terminates all the wavelengths by a pair of DWDM mux and demux, an array of O-E-O regenerators, and an electronic cross-connect/switch, such as the one illustrated in FIG. 2. If the central hub in FIG. 2 does not terminate all the wavelengths by DWDM mux/demux and O-E-O regenerators, there is a possibility that the wavelengths may circulate perpetually around the ring especially when excessive amplifications are supplied along the ring. This positive net gain can cause lasing phenomenon and consequently unstable received signals. A solution proposed in U.S. Pat. No. 6,192,173 is that a controlled loss can be added to the ring, and the net round-trip loss should be large enough to prevent the onset of positive feedback but is sufficiently small to allow detection of optical signals to occur with a certain acceptable bit-error-rate. This method makes network control very complicated because adaptive loss control must be provided to different ring sizes and number of nodes, and the system bit-error-rate performance can be degraded.

In FIG. 1(a), wavelength add-drop is carried out by using two optical circulators and a fiber Bragg grating (FBG). The FBG performs the "drop" function by reflecting a wavelength through the first optical circulator. Consequently, when there are two or more wavelengths needed to be dropped, more FBGs are inserted between the two optical circulators, and service disruption is incurred. In FIG. 1(b), dynamic wavelength OADM is implemented in terms of wavelength separation and combination devices (e.g., a DWDM wavelength/band mux/demux pair), together with one or more optical switches—such as 2×2 or N×N devices.

For those wavelengths or bands that should pass through the particular node, the mux and demux pair are connected back-to-back, while for those wavelengths or bands to be dropped and added, there is a 2×2 switch inserted between the mux/demux pair. Depending on the predicted traffic per node, a system planner needs to pre-plan how many 2×2 switches must be placed in advance. This results in two problems, (1) once a fixed number of 2×2 switches are installed, future upgrade to install more switches can cause service disruptions, and (2) if an N×N switch is installed right at the beginning to cover every possible wavelength/band add-drop in the future, its cost will be high. In addition, the N×N switch long-term reliability is still questionable.

Despite the inflexible and non-scalable structure of the OADMs they do offer the wavelength reuse feature, i.e., the added wavelength can be the same as the dropped wavelength. This is a useful feature for ring networks with limited number of available wavelengths.

Another type of optical ring network, illustrated in FIGS. 3(a) and 3(b), uses optical couplers along the main path of the ring network to replace the complicated OADMs. This kind of optical network is a broadcast-and-select optical network, also referred to as a "one-hop" networks, which has been investigated in a DWDM all-optical star (R. Ramaswami and K. N. Sirarajan, *Optical Networks:. a practical perspective*, Morgan, 1998) and proposed in ring networks ("Flexible WDM network architecture", U.S. Pat. No. 6,192,173, April 2001). A summary of a few variations of the arrangement of the two optical fiber couplers, booster optical amplifier, in-line or pre-amplifier, is shown in FIGS. 4(a) through 4(c).

In a broadcast-and-select architecture, whenever an optical transmitter launches a wavelength into the network, any user on the ring can receive this message (the "broadcast" characteristic of the network). A receiver receives its desired signal by using either a tunable filter or a fixed filter/demultiplexer (the "select" characteristics of the receiver). A tunable laser can also be used to launch a dynamically tunable wavelength into a fixed optical filter on the receiving end. In either case, the disadvantage is that no wavelength can be re-used. This is because the dropped wavelength will continue to propagate along the rest of the ring network(s), and no other nodes can use the dropped wavelength any more. Consequently, each transceiver card must receive at a specific wavelength, $\lambda_x$, and transmit at another wavelength, $\lambda_y$. This implies the broadcast-and-select network consumes wavelengths twice faster than DWDM networks using conventional OADMs. Most of today's metro-ring optical networks have a limited number of available wavelengths, consequently one cannot afford not to "re-use" the "dropped" wavelengths. Therefore, today's DWDM metro-ring optical network seldom uses broadcast-and-select scheme.

There is a need to provide an all optical network, and method, that eliminates all of the wavelength converters and regenerators between optical networks. There is a further need for an all optical network, and method, that eliminates all of the wavelength-dependent OADMs within an optical ring network. There is a further need to provide a large number of wavelengths available in an all optical network to facilitate the use of the broadcast-and-select all-optical fiber network architecture. There is a further need to design an all-optical protection scheme for this broadcast-and-select network which eliminates wavelength-dependent OADMs, regenerators, and any form of wavelength converters.

SUMMARY OF THE INVENTION

Accordingly, an object of the present invention is to provide an all optical network that eliminates all of the wavelength converters and regenerators between optical networks.

Another object of the present invention is to provide an all optical network that eliminates wavelength-dependent OADM's within an optical ring network.

A further object of the present invention is to provide a method for transmission in an optical network that uses a large number of wavelengths to eliminate the need for complicated OADM's, and to make the broadcast-and-select all-optical network architecture practically usable.

Another object of the present invention is to provide a method that uses a large number of wavelengths that are transmitted over a long distance to cover multiple interconnected optical networks to eliminate all of the wavelength converters and regenerators between optical networks and all of the wavelength-dependent OADMs within an optical ring network.

Another object of the present invention is to provide the combination of a dynamic wavelength-tunable optical transmitter and a dynamic wavelength-tunable receiver to ia simplify dynamic wavelength provisioning and configurability.

Yet another object of the present invention is to provide a method of transmitting optical signal traffic in a multiple ring optical network by separating the optical signal traffic into ring bands, with the entire network transmitting all of the optical signal traffic and each ring receiving only its designated ring band.

Another object of the present invention is to provide a method of transmitting optical signal traffic in a hierarchical ring optical network by separating the optical signal traffic into ring bands, with the entire network transmitting all of the optical signal traffic and each ring receiving only its designated ring band.

These and other objects of the present invention are achieved in a method of transmitting optical signal traffic. An all optical network is provided with at least two rings that are geographically dispersed. Each ring includes at least one transmitter and at least one receiver. The available wavelengths are separated into distinct ring bands. The optical signal traffic is shared throughout the entire optical network. Each ring is provided with its own distinct ring band of the optical signal traffic. All of the optical signal traffic is transmittable throughout the optical network. Each receiver is configured to receive only wavelengths in a ring band designated for its associated ring.

In another embodiment of the present invention, a method of transmitting optical traffic provides an all optical network with at least two rings that are geographically dispersed. Each ring includes at least one transmitter and at least one receiver. A large number of wavelengths are shared in the at least two rings without O-E-O conversions between the rings. The optical signal traffic is shared throughout the entire optical network. Each ring is provided with its own distinct ring band of the optical signal traffic. All of the optical signal traffic is transmittable throughout the optical network. Each receiver is configured to receive only wavelengths in a ring band designated for its associated ring.

In another embodiment of the present invention, a method of transmitting optical signal traffic provides an all optical network with hierarchical rings. Each hierarchical ring has a plurality of nodes and each node includes at least one transmitter and one receiver. The optical signal traffic is separated into ring bands. The optical signal traffic is transmitted through all of the hierarchical rings providing each hierarchical ring with its own distinct ring band. All of the available wavelengths are transmittable throughout each hierarchical ring. The receivers of a hierarchical ring are configured to receive only wavelengths in a ring band that is designated for that hierarchical ring.

In another embodiment of the present invention, an all optical network for optical signal traffic has at least a first and a second ring. Each ring has at least one transmitter and one receiver and its own distinct ring band of the optical signal traffic. All of the optical signal traffic is transmittable throughout the entire all optical network. Each receiver is configured to receive only wavelengths in a ring band designated for its associated ring. A central hub couples the at least first and second rings and separates the optical signal traffic into ring bands.

In another embodiment of the present invention, an all optical network includes a first ring with at least first and second protection fibers that carry all of the optical signal traffic. The optical signal traffic travels in a clockwise direction in the first protection fiber and in a counter-clockwise direction in the second protection fiber. At least one 1×1 or a 1×2 switch is coupled to each first and second protection fiber. The 1×1 or 1×2 switch is maintained in an open position when there is no break point in the ring and closed upon an occurrence of a break point in the ring.

In another embodiment of the present invention, a method of transmitting optical ring traffic provides a broadcast-and-select optical network. A sufficient number of wavelengths are transmitted over a long distance in the optical network to eliminate wavelength converters and regenerators between rings in a network.

DETAILED DESCRIPTION OF THE PREFERRED EMBODIMENTS

In one embodiment of the present invention, methods are provided for transmitting optical signal traffic. An all optical network is utilized with at least two rings that are geographically dispersed. Each ring has at least one transmitter and receiver. A sufficiently large enough number of wavelengths is shared in both rings to achieve the sharing without O-E-O conversions between the rings. Alternatively, the available wavelengths are separated into distinct ring bands. The optical signal traffic is shared throughout the entire optical network. Each ring is provided with its own distinct ring band of the optical signal traffic. All of the optical signal traffic is transmittable throughout the optical network. Each receiver is configured to receive only wavelengths in a ring band designated for its associated ring.

The present invention also provides all optical networks for optical signal traffic. In one embodiment the all optical network has at least first and second rings. Each ring has at least one transmitter and receiver and its own distinct ring band of the optical signal traffic. All of the optical signal traffic is transmittable throughout the entire all optical network. Each receiver is configured to receive only wavelengths in a ring band designated for its associated ring. A central hub couples the first and second rings and separates the optical signal traffic into ring bands.

In another embodiment of the present invention, an all optical network includes a first ring with at least first and second protection fibers that carry all of the optical signal traffic. The optical signal traffic travels in a clockwise direction in the first protection fiber and in a counter-clockwise direction in the second protection fiber. At least one 1×1 or a 1×2 switch is coupled to each first and second protection fiber. The 1×1 or 1×2 switch is maintained in an open position when there is no break point in the ring and closed upon an occurrence of a break point in the ring.

Figure 4A:
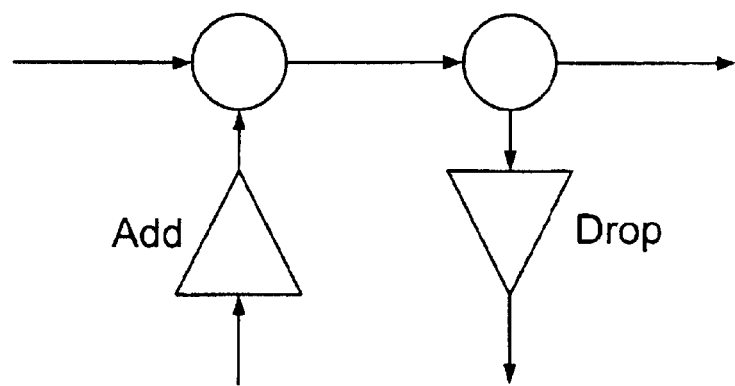
FIGS. 4(a) through (c) illustrate various arrangements of an in-line amplifier, booster amplifier and optical fiber couplers in each node along a ring network.
Figure 4B:
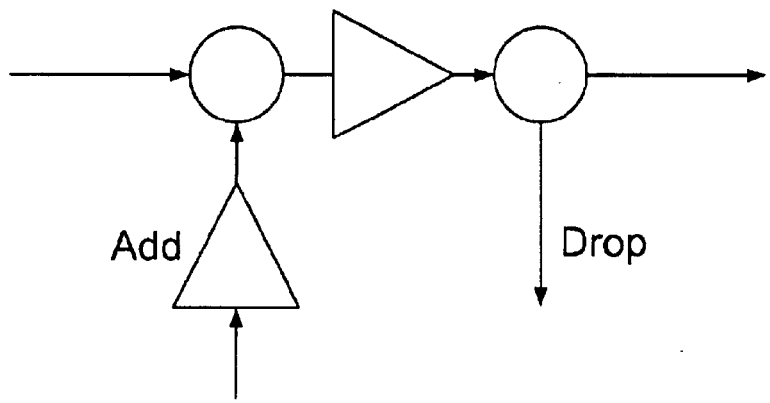
Figure 4C:
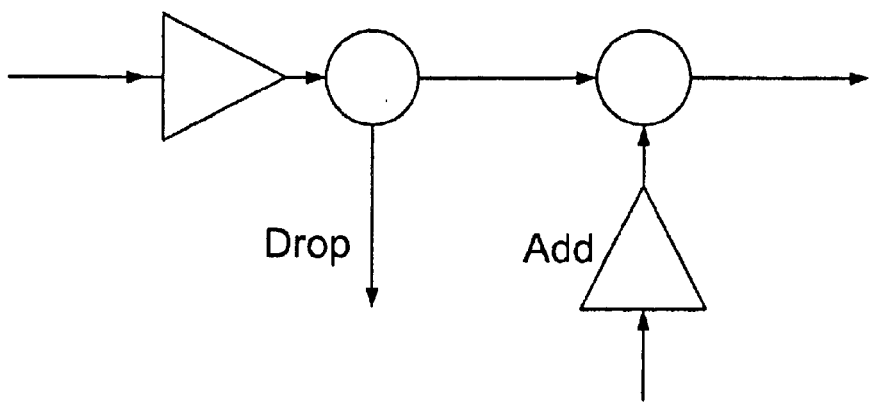

With the methods and networks of the present invention, various arrangements of in-line amplifiers, booster amplifiers and optical fiber couplers in each node can be used, such as those illustrated by way of example and without limitation in FIGS. 4(a) through (c).

Figure 5A:
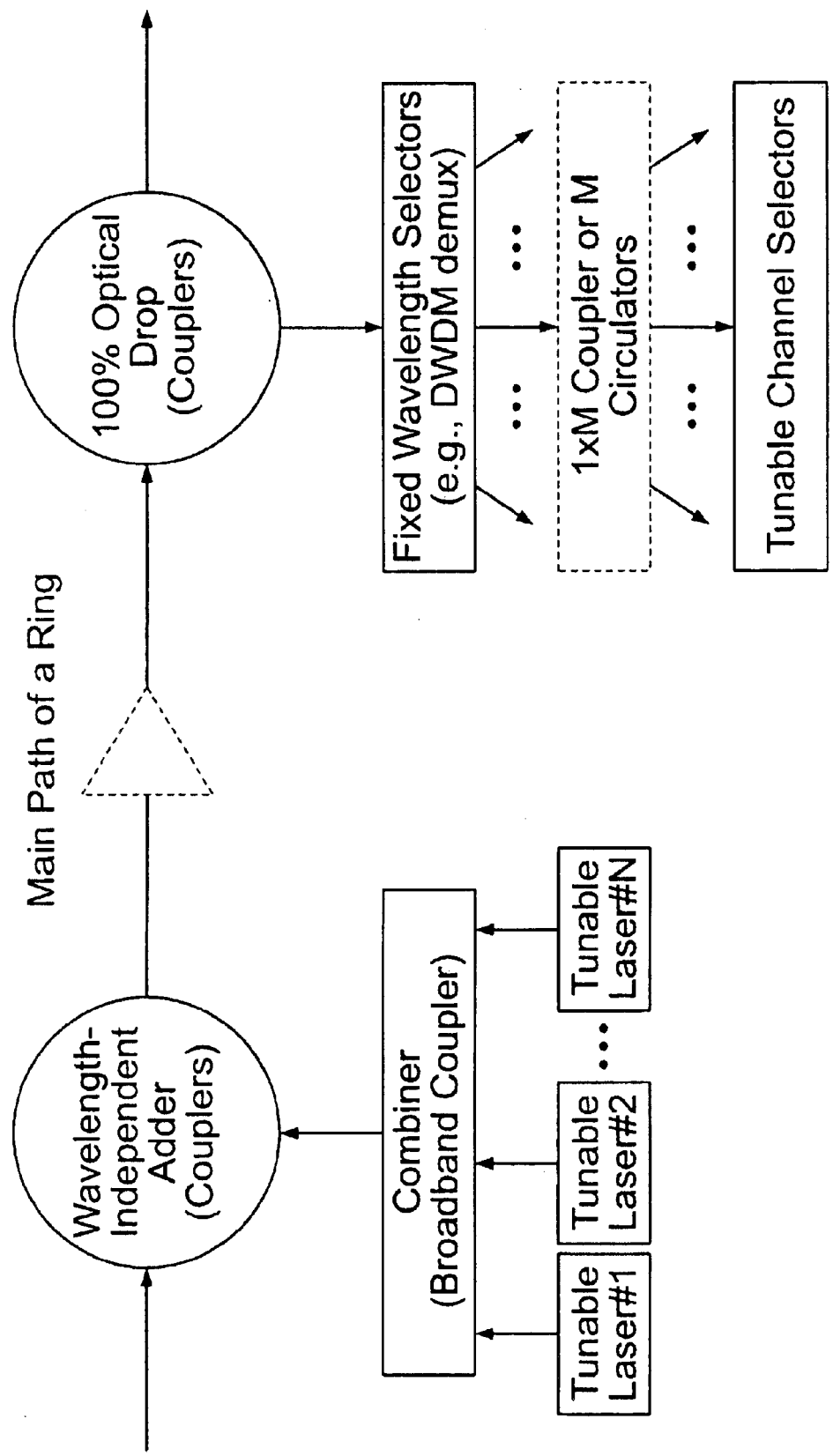
FIG. 5(a) illustrates one embodiment of a wavelength-add-drop hierarchy.

FIG. 5(a) illustrates one example of a wavelength-add-drop hierarchy. As shown, along the main path of the ring network only broadband couplers, and possibly optical amplifiers, are used. On the addition side, an array of tunable lasers are added through an optical coupler. On the drop side, a fixed wavelength demultiplexer or an optical filters is located after a main-path coupler. Following the demultiplexer or optical filter an optional 1×M optical splitter and M tunable optical filters can be included. Each is utilized to extract a sub-wavelength channel.

Figure 5B:
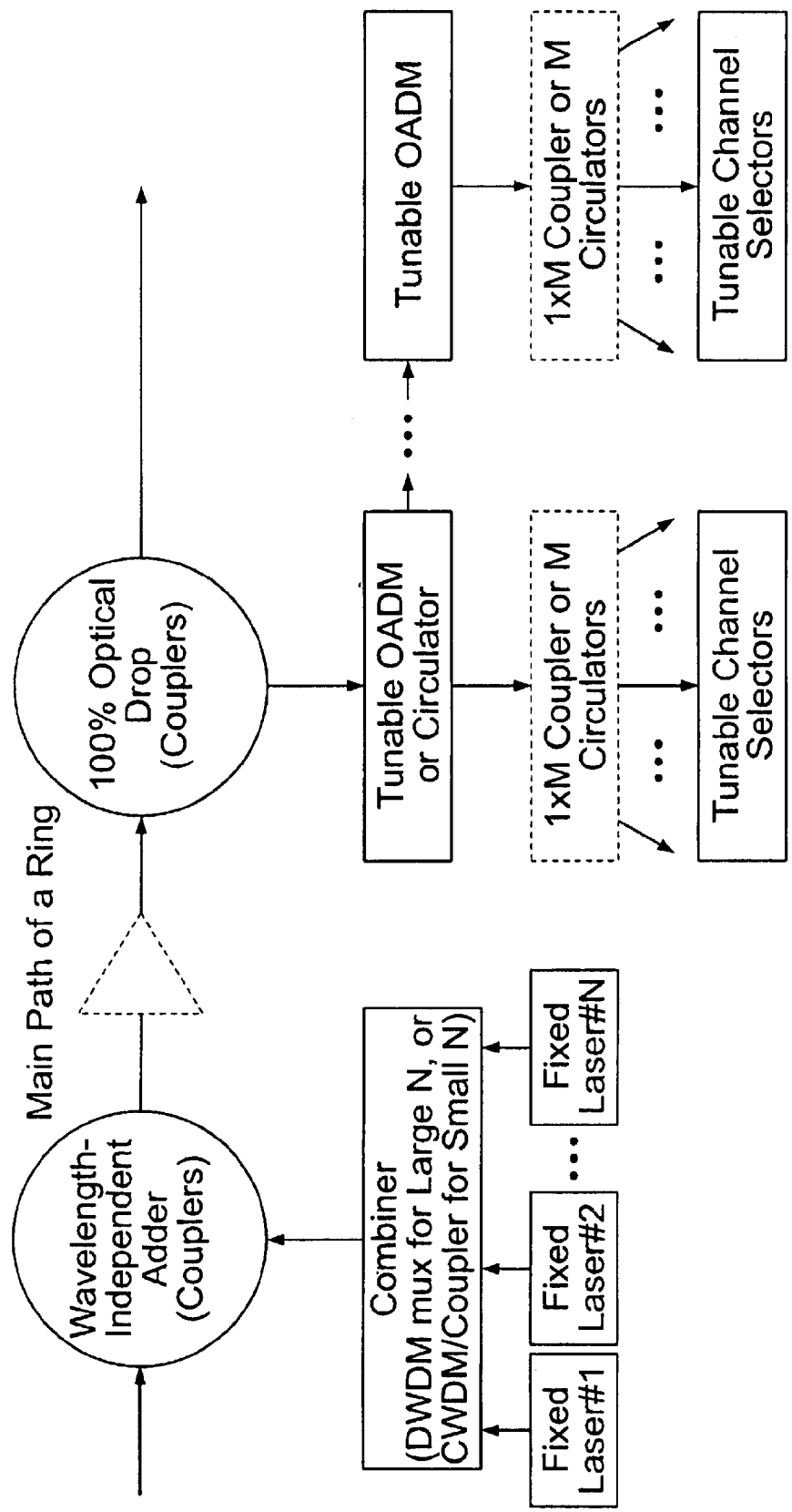
FIG. 5(b) illustrates another embodiment of a hierarchical wavelength add-drop.

FIG. 5(b) illustrates another example of a hierarchical wavelength add-drop. As shown, along the main path of the ring network only broadband couplers, and possibly optical amplifiers, are used. On the addition side, an array of N fixed lasers are added through a DWDM multiplexer, for a large N, through a CDWM multiplexer or an optical coupler for a small N. On the drop side, a tunable wavelength OADM is located after the main-path coupler. Following the demultiplexer or optical filter is an optional 1×N optical splitter and N tunable optical filters. These extract a sub-wavelength channel.

Figure 6:
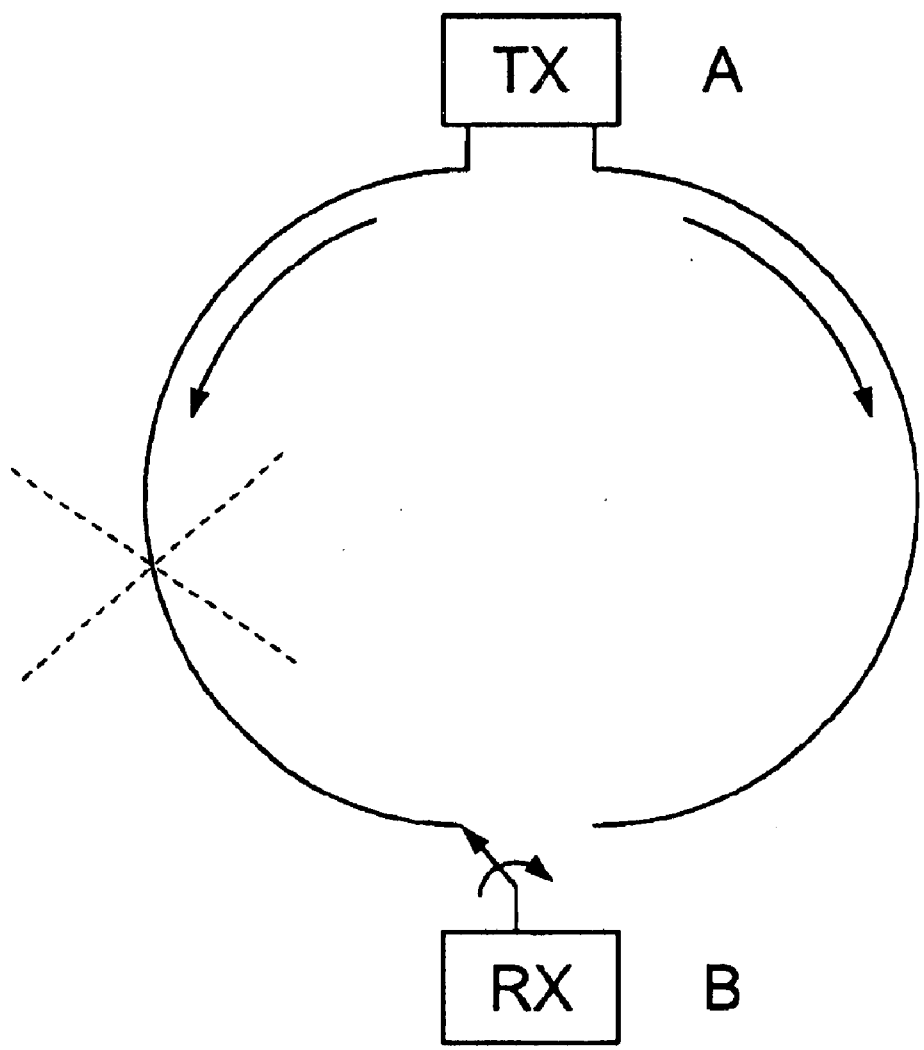
FIG. 6 is a diagram of a conventional SONET uni-directional protection switching ring (UPSR).

FIG. 6 is included to illustrate a conventional SONET uni-directional protection switching ring (UPSR) that can be used with the methods and networks of the present invention.

Figure 7:
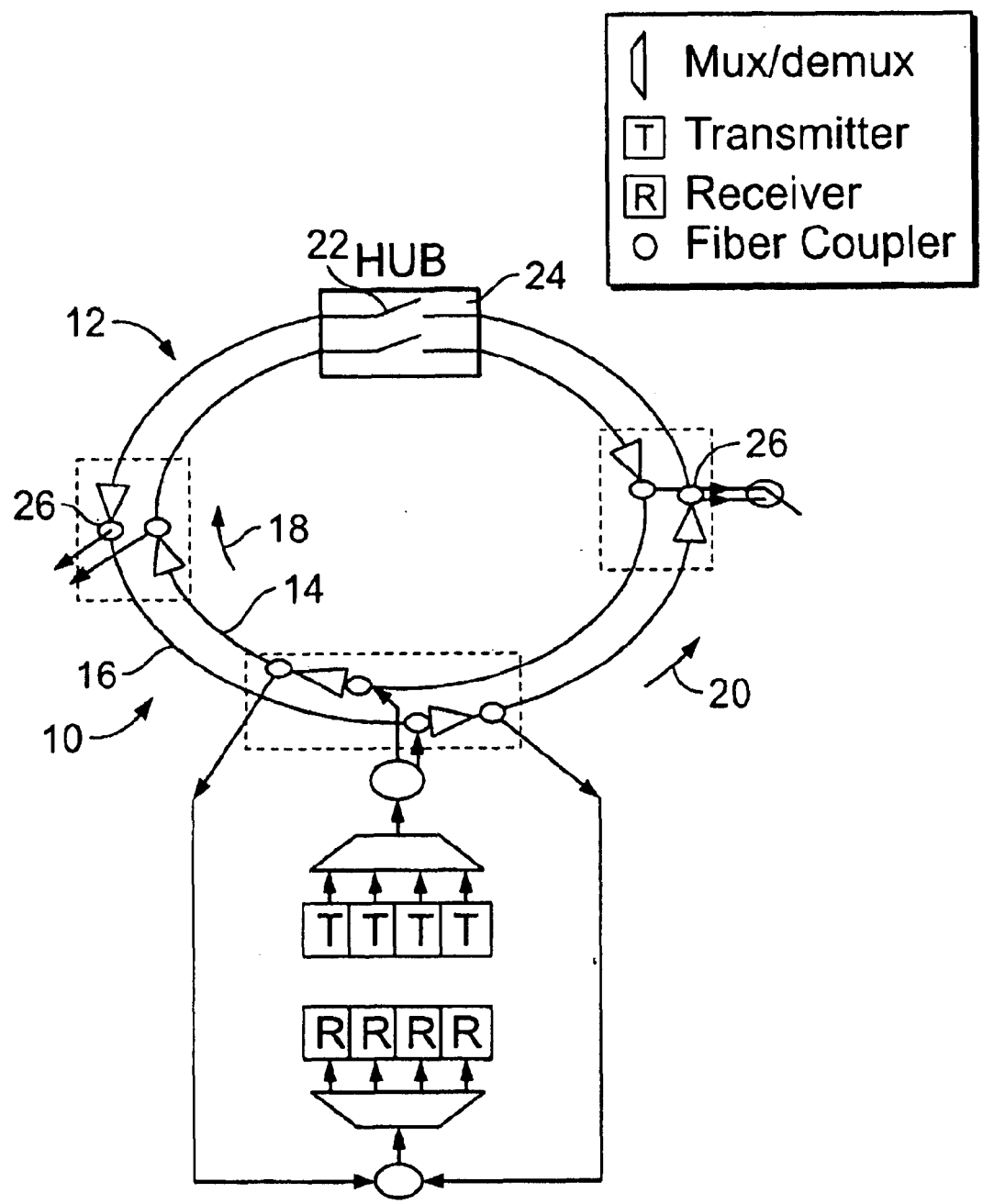
FIG. 7 illustrates one embodiment of a two-fiber broadcast-and-select ring architecture of the present invention, with a pair of 1×1, or 1×2 switches in the central hub.

One embodiment of the present invention, illustrated in FIG. 7, is an all optical network 10 with a first ring 12 that has at least first and second protection fibers 14 and 16 that carry all of the optical signal traffic of network 10. Optical signal traffic travels in a clockwise direction 18 in first protection fiber 14 and in a counter-clockwise direction 20 in second protection fiber 16. At least one 1×1 or 1×2 switch 22 is coupled to first and second protection fibers 14 and 16 in a central hub 24 or at any nodes 26 of network 10. Switch 22 is open under normal conditions and a break point is maintained in ring 12. A perpetual re-circulating of optical signal traffic is prevented. Each node includes one or more transmitters and receivers, mux/demux and fiber coupler. Every transmitter in network 10 launches its signal in both first and second fibers 14 and 16. Because of the break point in central hub 24 only one of these duplicated signals can be received at a destination. The break point in central hub 24 also prevents the two duplicated signals arriving at the same destination in which case the two signals may be combined destructively, they may be 180° out of phase.

Figure 8A:
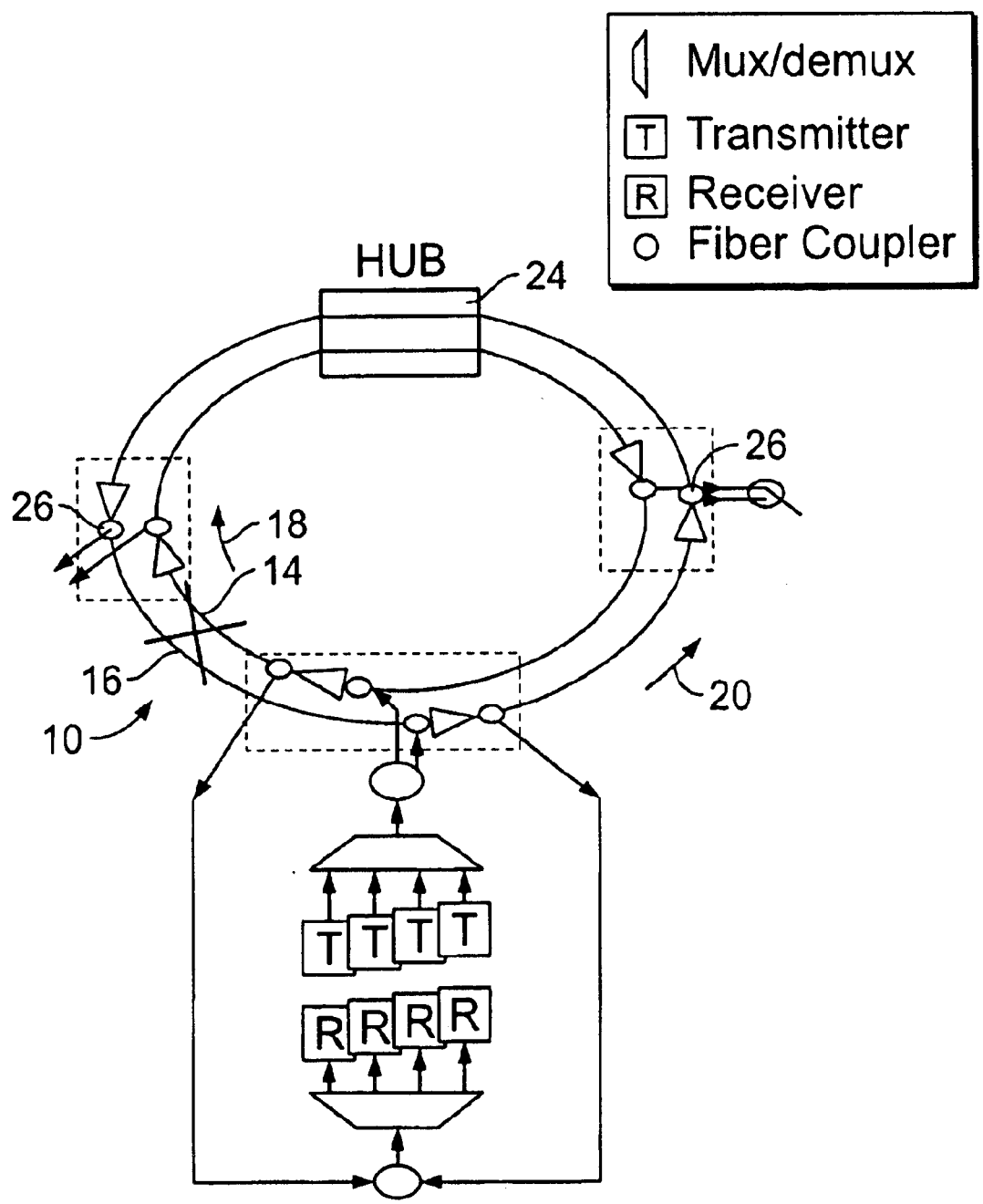
FIG. 8(a) illustrates operation of protection switches in the central hub and nodes of the FIG. 7 embodiment when both fibers break.
Figure 8B:
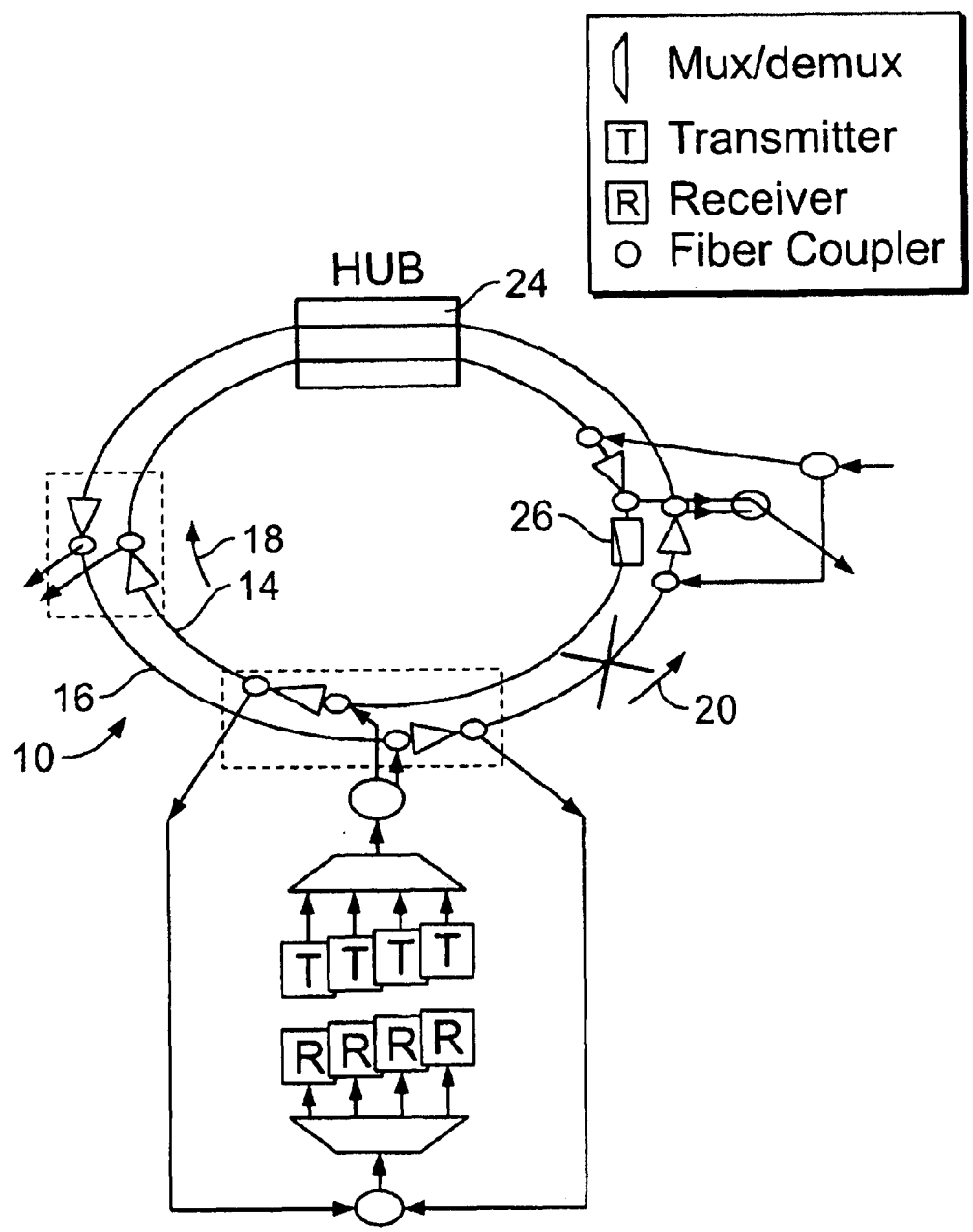
FIG. 8(b) illustrates operation of protection switches in the central hub and nodes of the FIG. 7 embodiment when a single fiber breaks.
Figure 8C:
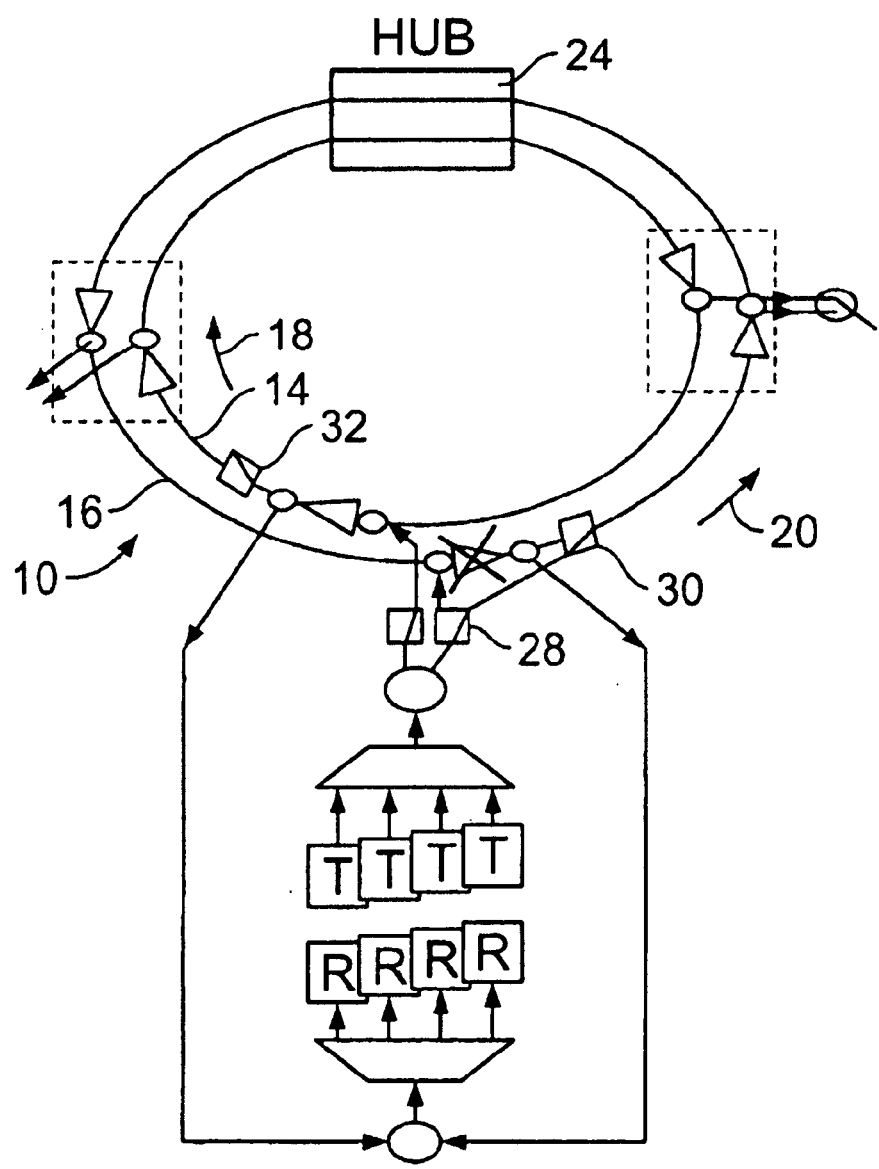
FIG. 8(c) illustrates operation of protection switches in the central hub and nodes of the FIG. 7 embodiment when a single optical amplifier fails.

When there is a broken fiber in network 10, as shown in FIG. 8(a), a new break point is created. The old break point in hub 24 is immediately closed for both first and second protection fibers 14 and 16. Several other fiber or optical amplifier break conditions can also be protected by turning on and off the pair of 1×1 switches, as illustrated in FIGS. 8(b) through 8(c). The embodiments of FIGS. 8(a) through (c) use the FIG. 4(b) node configuration.

In FIG. 8(a), both first and second fibers 14 and 16 are broken. In FIG. 8(b), there is a failure in a single optical amplifier in the counter-clock-wise fiber as indicated by a cross sign, and optical switch 29 is open to ensure that there is a break point in the clock-wise working fiber 14 wing. In FIG. 8(c) a failure exists in one optical amplifier in the counter-clock-wise fiber 16. Optical switches 28 and 30 are switched in order to let launched signal bypass the failed in-line amplifier. Optical switch 32 is switched to open position to ensure that there is a break point in the clockwise fiber 14. In a normal operating condition, without a break or failure of a fiber or an amplifier, the transmitted signal arrives at the receiver in the clock-wise direction 18 or the counter-clock-wise direction 20 but not in both. In FIGS. 8(a) through (c), the add and drop arrangement is the same as illustrated in FIG. 4(b).

Figure 9:
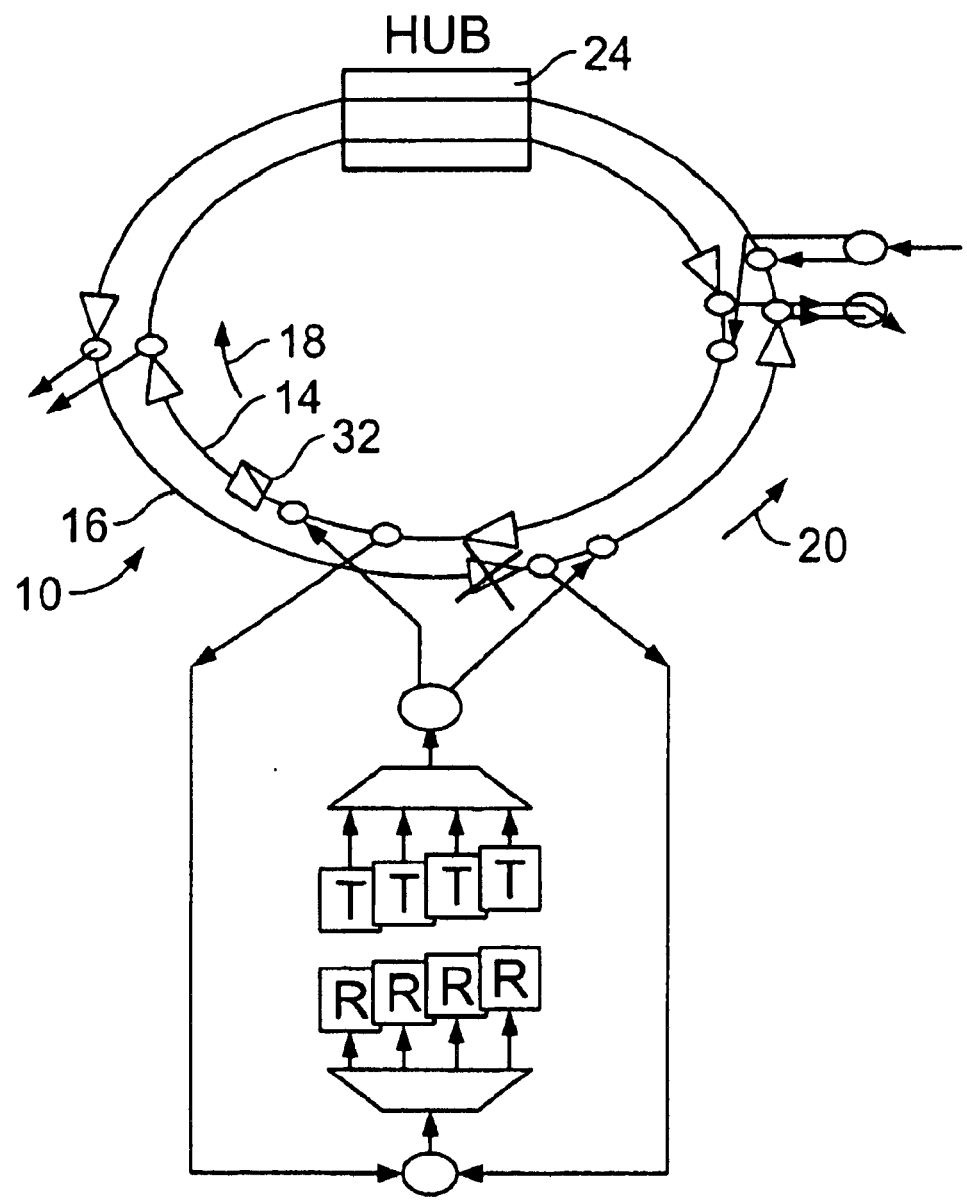
FIG. 9 illustrates operation of protection switches in the central hub and a node when a single optical amplifier fails.

In another embodiment of the present invention, illustrated in FIG. 9 where the node structure follows that of FIG. 4(c), only one switch 32 needs to be turned open to perform the same protection as that in FIG. 8(c). In the FIG. 9 embodiment, the add and drop arrangement is the same as that illustrated in FIG. 4(c).

In other embodiments of the present invention, a single fiber 34 is used instead of dual fibers, as illustrated in FIGS.

Figure 10A:
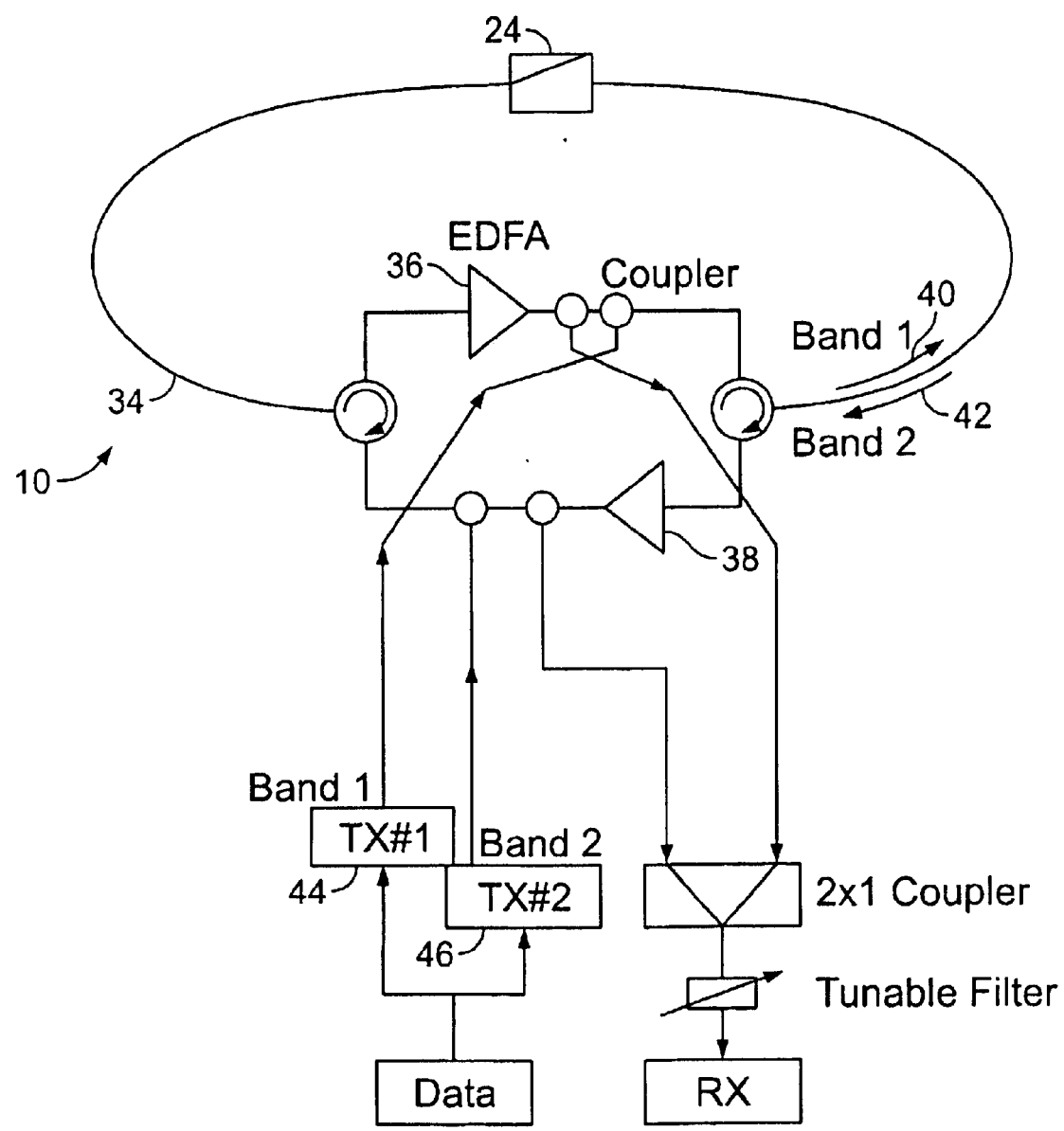
FIGS. 10(a) through (e) illustrate an alternative protection ring design when using a single optical fiber with east-bound traffic in one band, and west-bound traffic in another band.

10(a) through (e). In the FIGS. 10(a) through (e) embodiments each node has two optical amplifiers 36 and 38 arranged in such a condition that each one amplifies a band of optical signals and is oriented toward opposite directions. The same data is duplicated in the two bands 40 and 42 by using either two optical transmitters 44 and 46, as shown in FIG. 10(a), or by using a single transmitter 18 transmitting duplicated signals in different frequencies (wavelengths), as shown in FIG. 10(d). The receiver in each node can select either of the two bands, which come from different directions along the ring, by using a tunable filter which can tune from one band to the other.

Figure 10B:
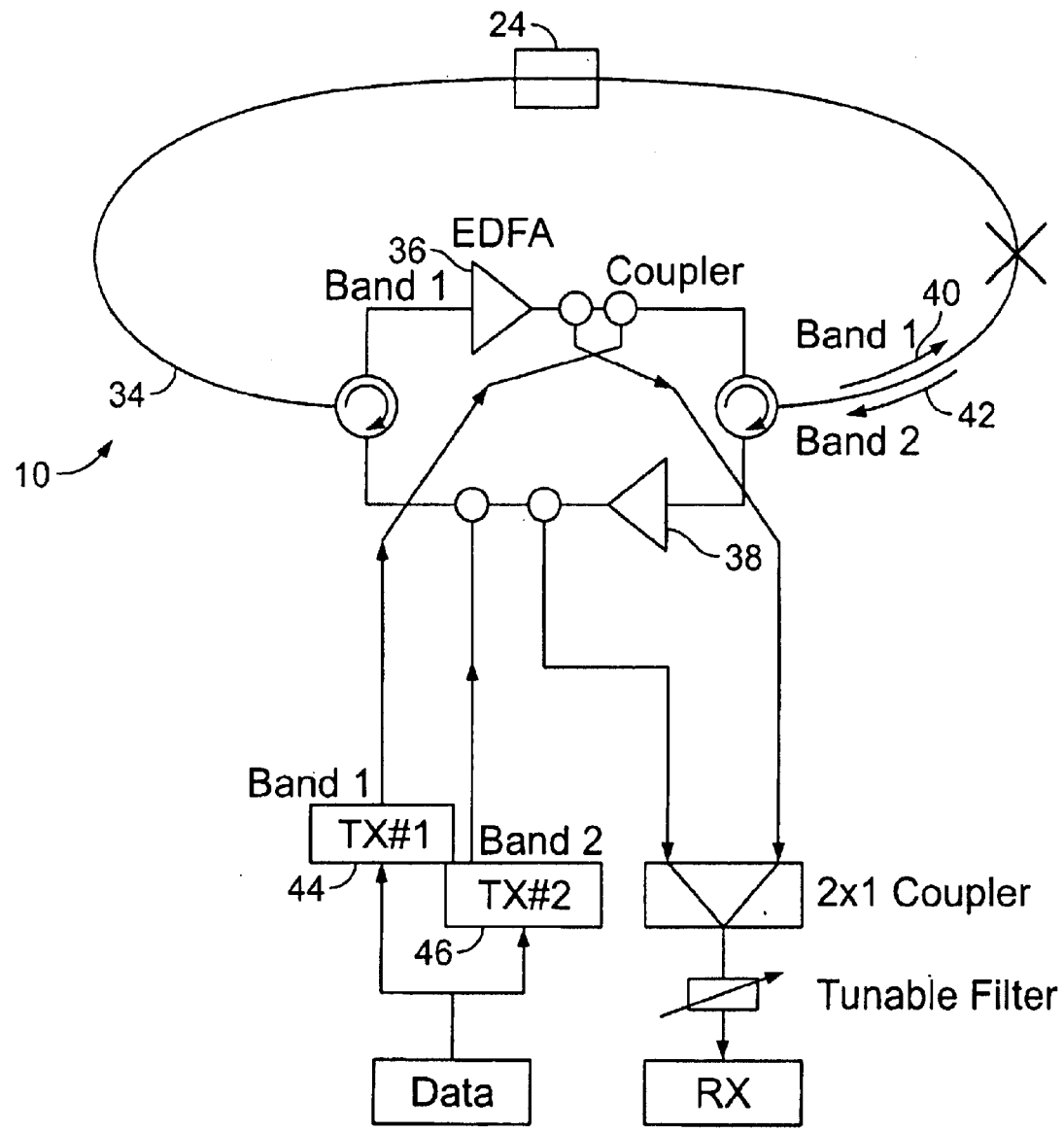
Figure 10C:
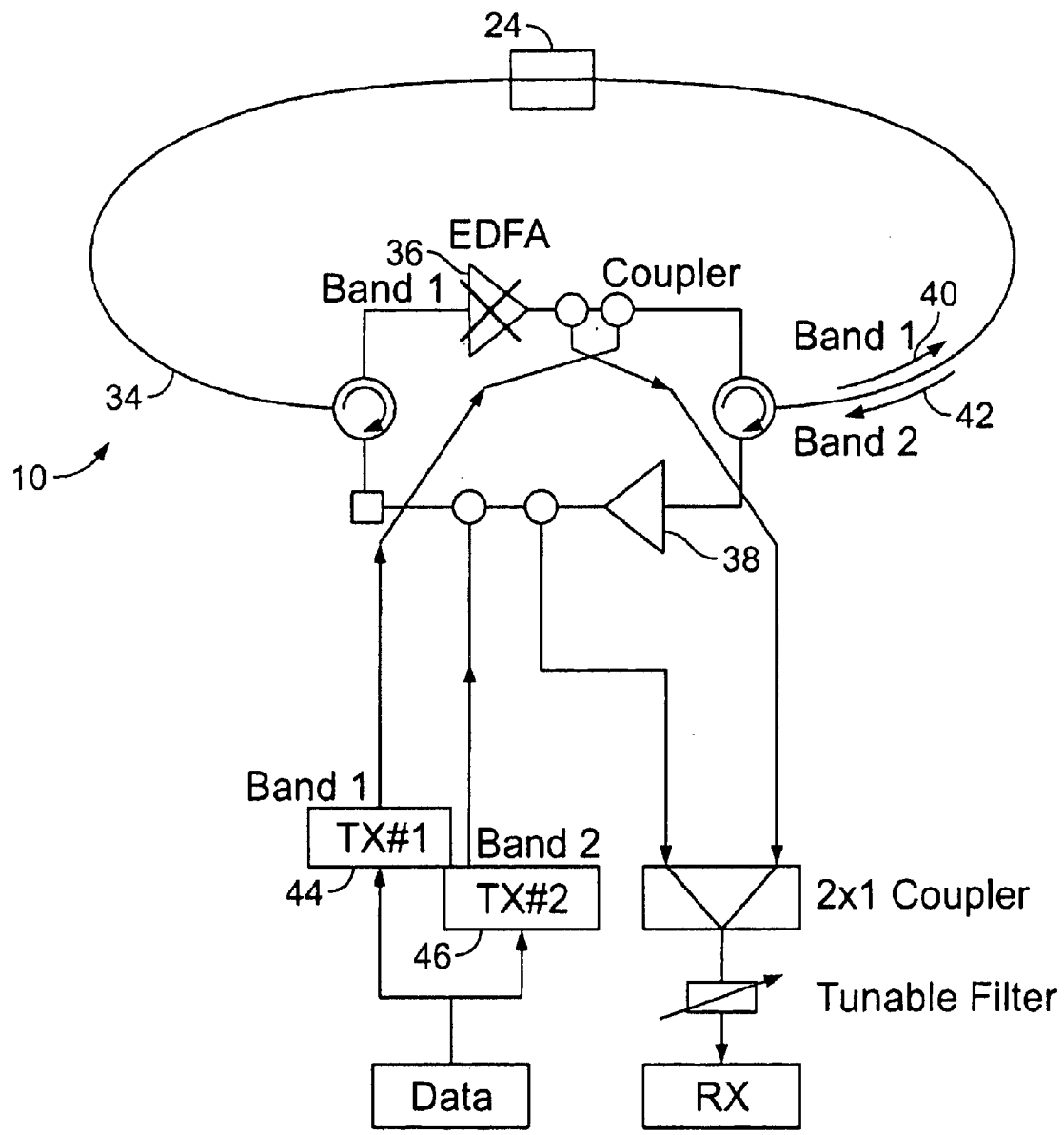
Figure 10D:
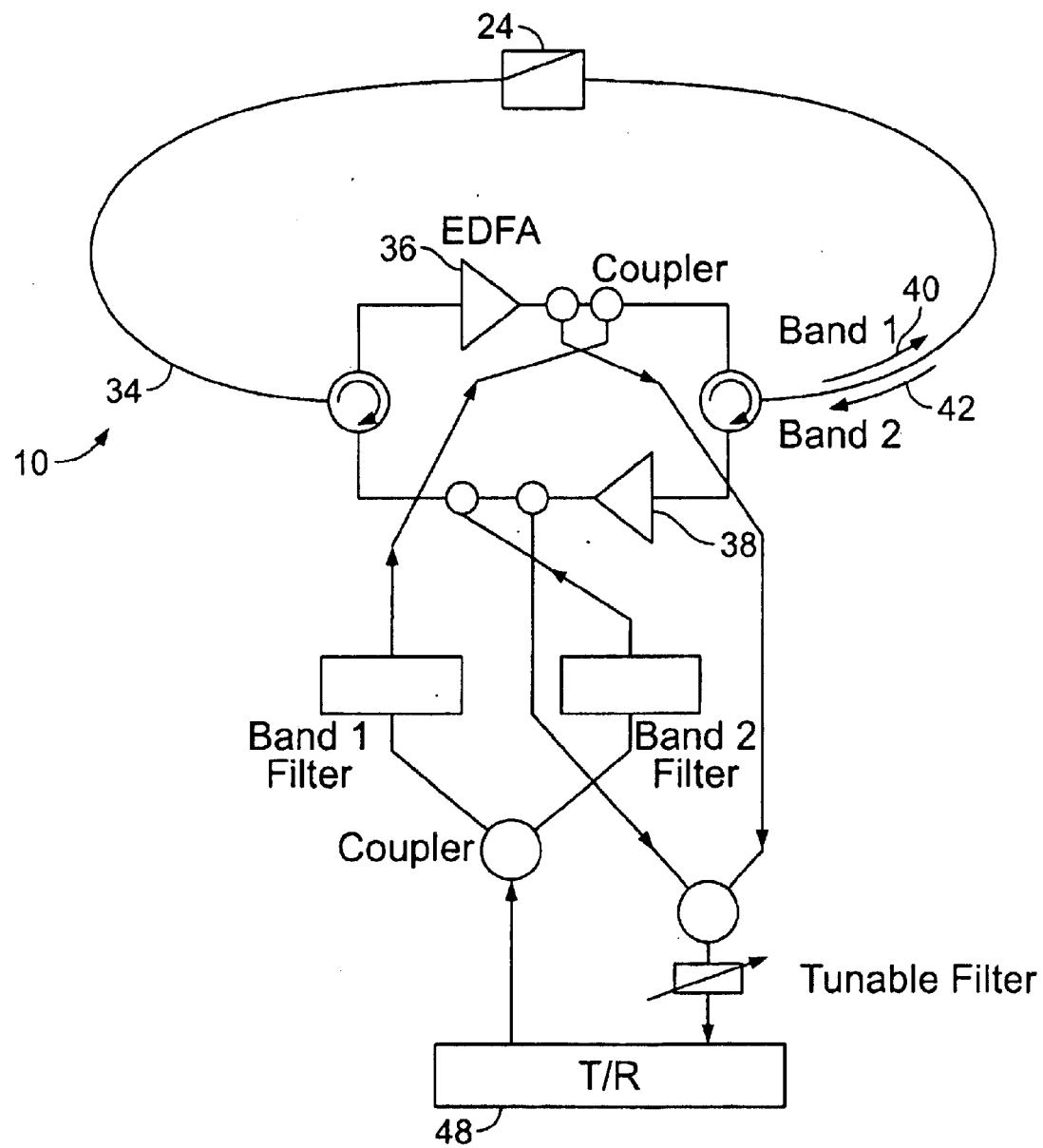
Figure 10E:
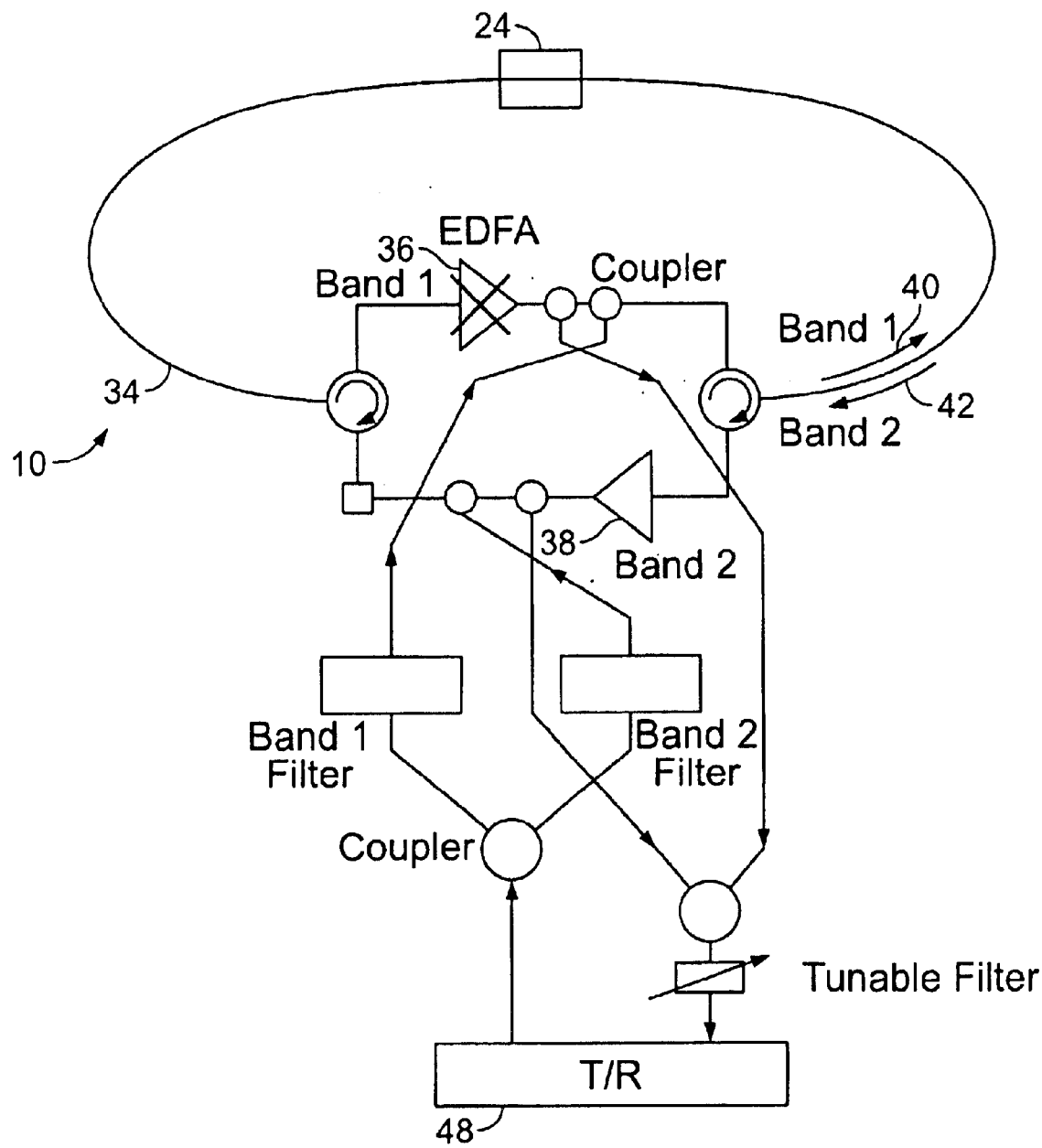

When there is a fiber break or amplifier failure, the operation principle is the same as that of dual-fiber rings, as illustrated in FIGS. 10(b), (c), and (e). It will be appreciated that the preferred node structure in FIGS. 10(b), (c) and (e) follows that of FIG. 4(c) instead of FIG. 4(b).

Figure 11:
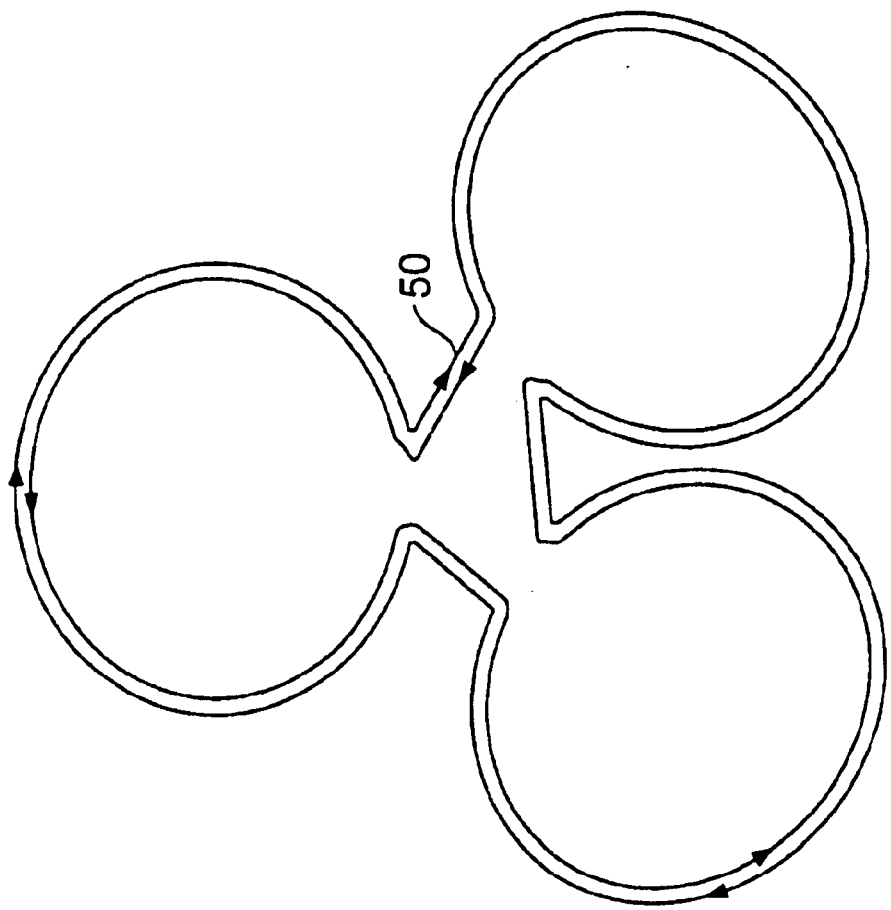
FIG. 11 illustrates that multiple rings can be interconnected in a manner such that they appear to be a single ring.
Figure 11:
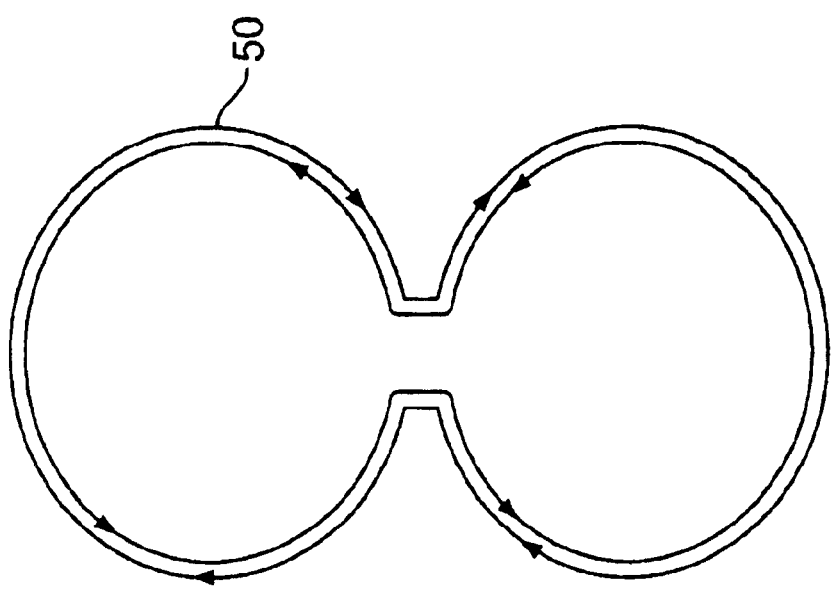

Ring to ring interconnection can be achieved by breaking the rings and interconnecting them to form a single ring 50, as illustrated in FIG. 11.

The FIG. 11 embodiment forces each in-line amplifier in each node to amplify all wavelengths traveling along the ring, even though the wavelengths were not intended for that particular node. This can increase the cost of optical amplifiers.

Figure 12:
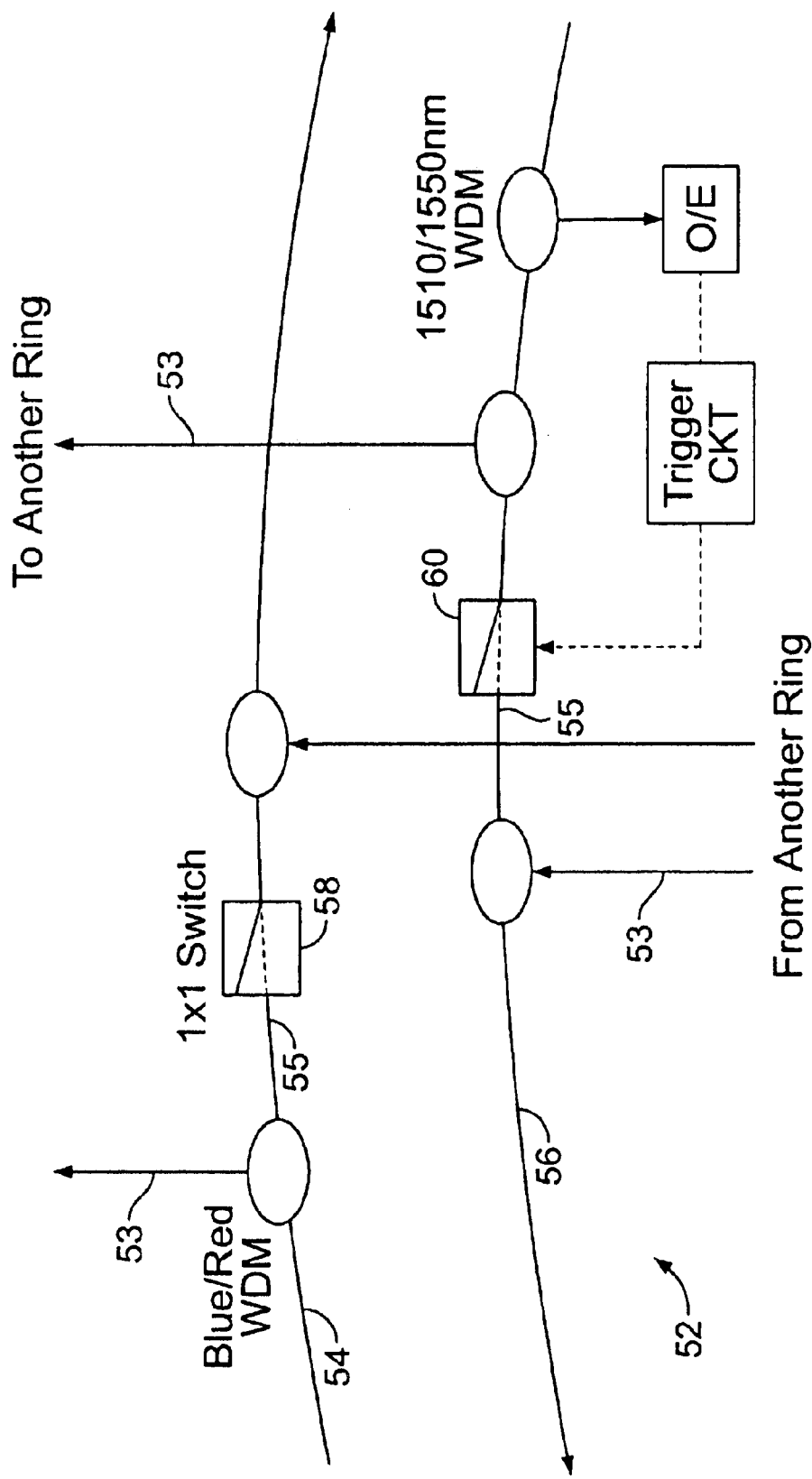
FIG. 12 illustrates a central hub construction without O-E-O conversions for interconnecting two ring networks.

In another embodiment of the present invention, illustrated in FIG. 12, the wavelength loading on the in-line amplifier in each node is alleviated. In FIG. 12, all optical network 52 for optical signal traffic includes at least first and second rings 54 and 56. Each ring 30 and 32 has at least one transmitter and one receiver and its own distinct ring band of the optical signal traffic. All of the optical signal traffic is transmittable throughout the entire all optical network 52. Each receiver is configured to receive only wavelengths in a ring band designated for its associated ring 54 and 56. A central hub couples first and second rings 54 and 56, and separates the optical signal traffic into the ring bands.

In FIG. 12, some of the wavelengths can be sent to a second ring without going back to the originating ring. Thus the wavelength loading on each optical amplifier can be alleviated.

By way of illustration, in FIG. 12 all the optical signal traffic is separated into two ring bands 53 and 55. Band 53 is for intra-ring traffic and band 55 is for hub or intra-ring traffic. Ring bands 53 and 55 can contain more than 200 wavelengths. Additionally, more than 200 wavelengths inside rings 54 and 56 can support both the wavelength-consuming broadcast-and-select architecture and long-term traffic growth. In FIG. 12, band 55 travels inside one ring, while band 53 goes to the second ring. Each ring 54 and 56 includes at least one 1×1 or 1×2 hub switch 58 and 60, respectively. Switches 58 and 60 are controlled by a reserved out-of-band optical supervision channel (OSC). In one embodiment, the OSC is a 1510 nm channel. The OSC channel travels along the entire ring 54 and 56 hop-by-hop, a illustrated in FIG. 13.

Figure 13:
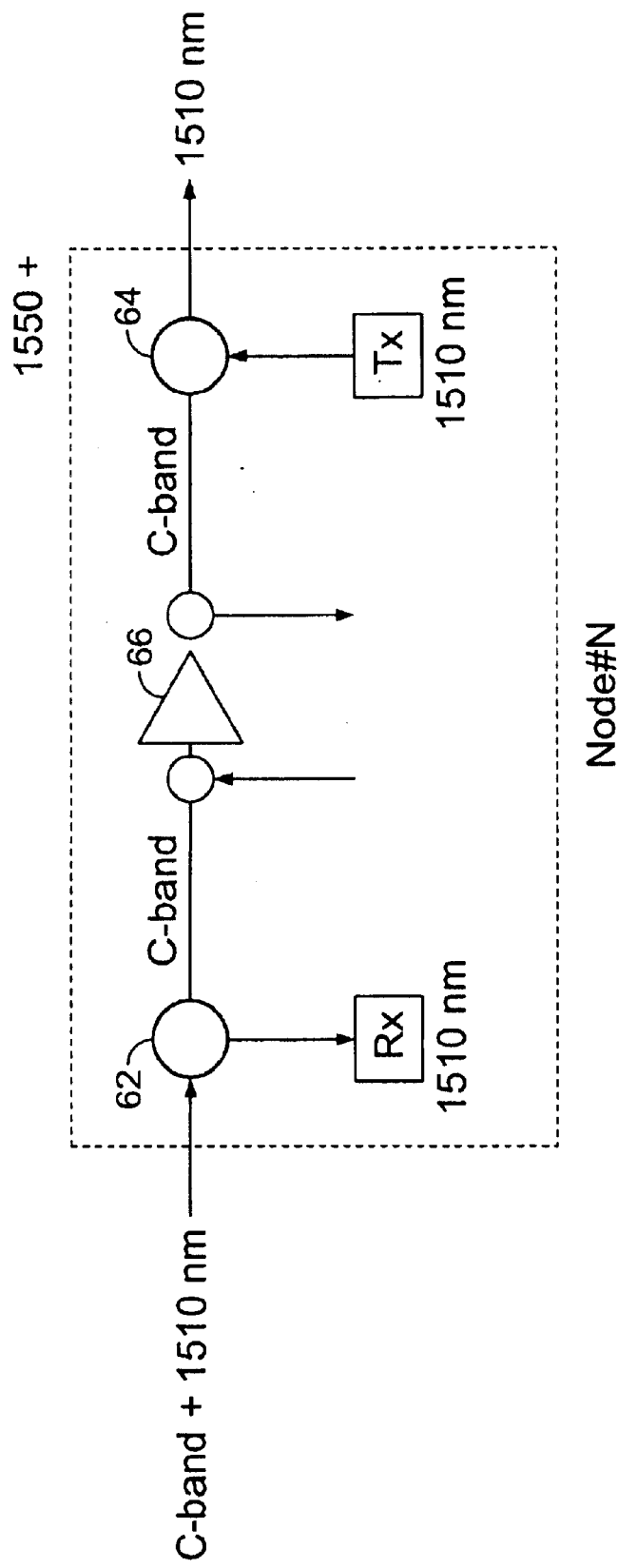
FIG. 13 illustrates an out-of-band optical supervision/communication channel at 1510 nm for inter-nodal communication and protection switching.

In FIG. 13, two C-band/1510 nm couplers 62 and 64 are provided, one extracts the 1510 nm supervision signal from the ring and the other couples the 1510 nm supervision signal back to the ring. Consequently, 1510 nm supervision signals, which contain various control and management information, do not have to pass through an optical amplifier 66. Because the out-of-band OSC channel monitors the operation status of both equipment and fiber in each ring node hop-by-hop, any fiber and/or amplifier break of network 52 can be immediately reported to a network manager based on the status of the OSC channel.

All or some of the ring bands can have the same or different numbers of optical signals. Preferably, none of the ring bands share common wavelengths and every wavelength in the optical signal traffic is in a ring band. First and second rings 54 and 56 can be geographically dispersed or hierarchical rings.

Rings 54 and 56 can be the same as ring 12 and include first and a second protection fibers 14 and 16, switch 22 and central hub 24, with the optical signal traffic traveling in clockwise direction 18 in first fiber 14 and in counter-clockwise direction 20 in second fiber 16. Again, in this embodiment, switch 22 is maintained in an open position when there is no break point in an associated ring, and is then closed when there is a break point in a ring.

Figure 14:
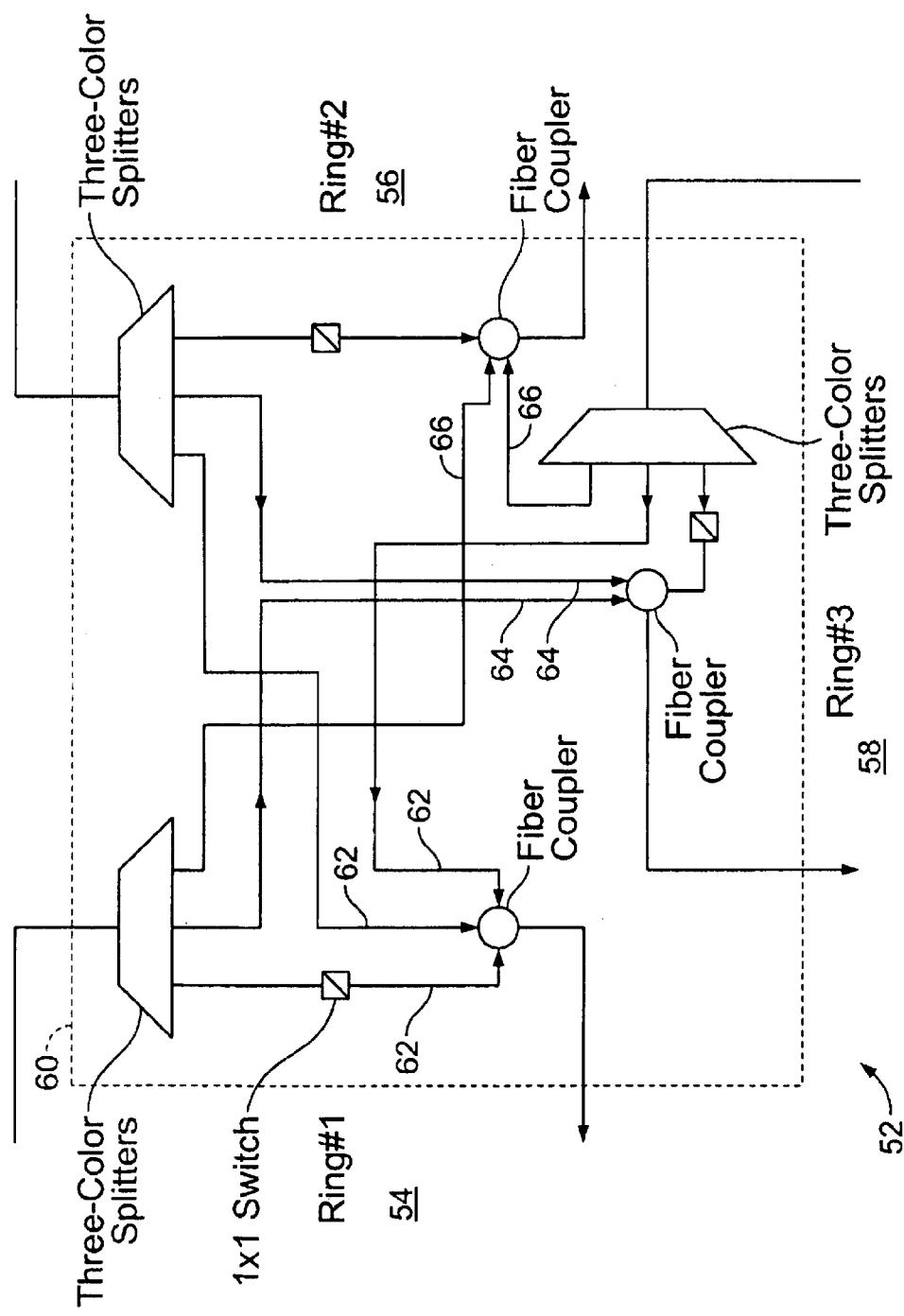
FIG. 14 illustrates a central hub construction without O-E-O conversions for interconnecting three ring networks.

An extension of FIG. 12, for three ring interconnection, is illustrated in FIG. 14. In FIG. 14, network 52 has a third ring 58 and a central hub 60 does not have O-E-O conversions. In this embodiment, optical signal traffic is separated into bands 62, 64 and 66 that are separately assigned to each ring 54, 56 and 58. Central hub 60 includes a band-splitter that separates the wavelengths of the optical signal traffic originated within network 52. In central hub 60, the optical signal traffic heading for first ring 54 combines with the optical signal traffic originating from second and third rings 56 and 58 and merge back into first ring 54. A similar structure is used for a second fiber. As illustrated, 1×3 couplers are used in each ring 54, 56 and 58 to combine the same band of signals from the three different rings.

It will be appreciated that the FIG. 14 embodiment can be extended to more than three rings. When the number of rings becomes large, multicolor band splitters, all-optical switches, and multi-color combiners are utilized as shown in FIG. 12. If each band contains P wavelengths, then the use of multi-band splitters and combiners can significantly reduce the size of the N×N switch or crossconnect (the conventional approach) by $P^2$ times. An M×M switch is used because its loss can significantly lower than that of 1×M couplers.

Figure 3A:
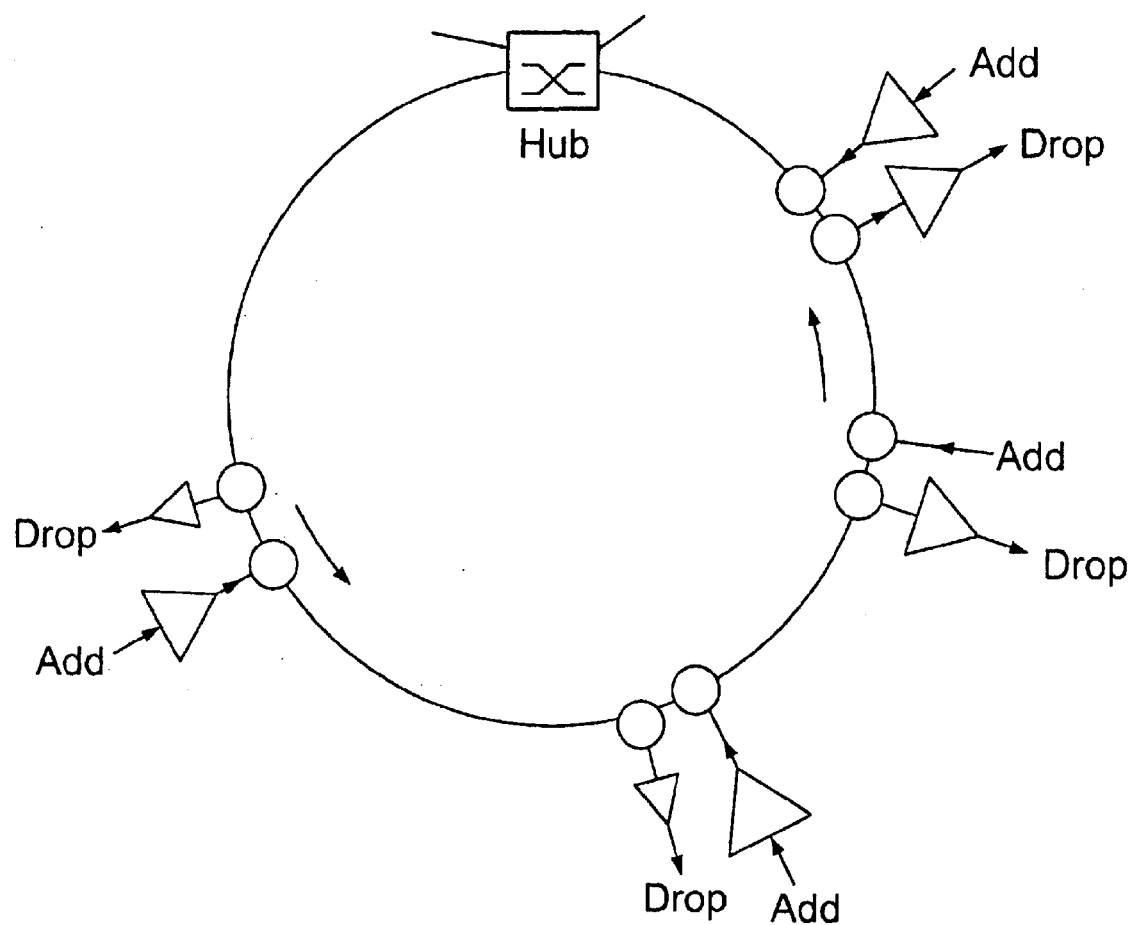
FIG. 3(a) is a schematic diagram of a broadcast-and-select or "one hop" optical ring network using only optical couplers at each node.

In another embodiment of the present invention, a sufficiently large enough number of wavelengths are shared in at least two rings of large metro ring networks to eliminate O-E-O conversions between the rings. In various embodiments, the number of wavelengths is greater than 300 wavelengths/fiber, greater than 250 wavelengths/fiber and greater than 200 wavelengths/fiber. It will be appreciated that this embodiment can be achieved with a different large number of wavelengths. These embodiments can be implemented, by way of illustration but without limitation, in the large metro ring networks illustrated in FIGS. 3(a) and 3(b). In the FIG. 3(a) embodiment, booster and pre-amplifiers may not be needed. In FIG. 3(a), the main path of the optical ring consists of only passive components. The FIG. 3(a) architecture is suitable for a small ring circumference. The FIG. 3(b) architecture is suitable for a ring network with a large circumference.

In these embodiments using a very large number of wavelengths, optical couplers are positioned along the main path of the ring network and all wavelength-dependent-OADMs are eliminated. This ring network is a broadcast-and-select optical network which is also referred to as a one-hop network. When optical amplifiers are not used, the number of available wavelengths can be extremely large, especially when the wavelength channel spacing is much smaller than the conventional ITU gird. In this case, however, the network size may be relatively small, because each coupler introduces additional loss.

Figures 1A, 1B:
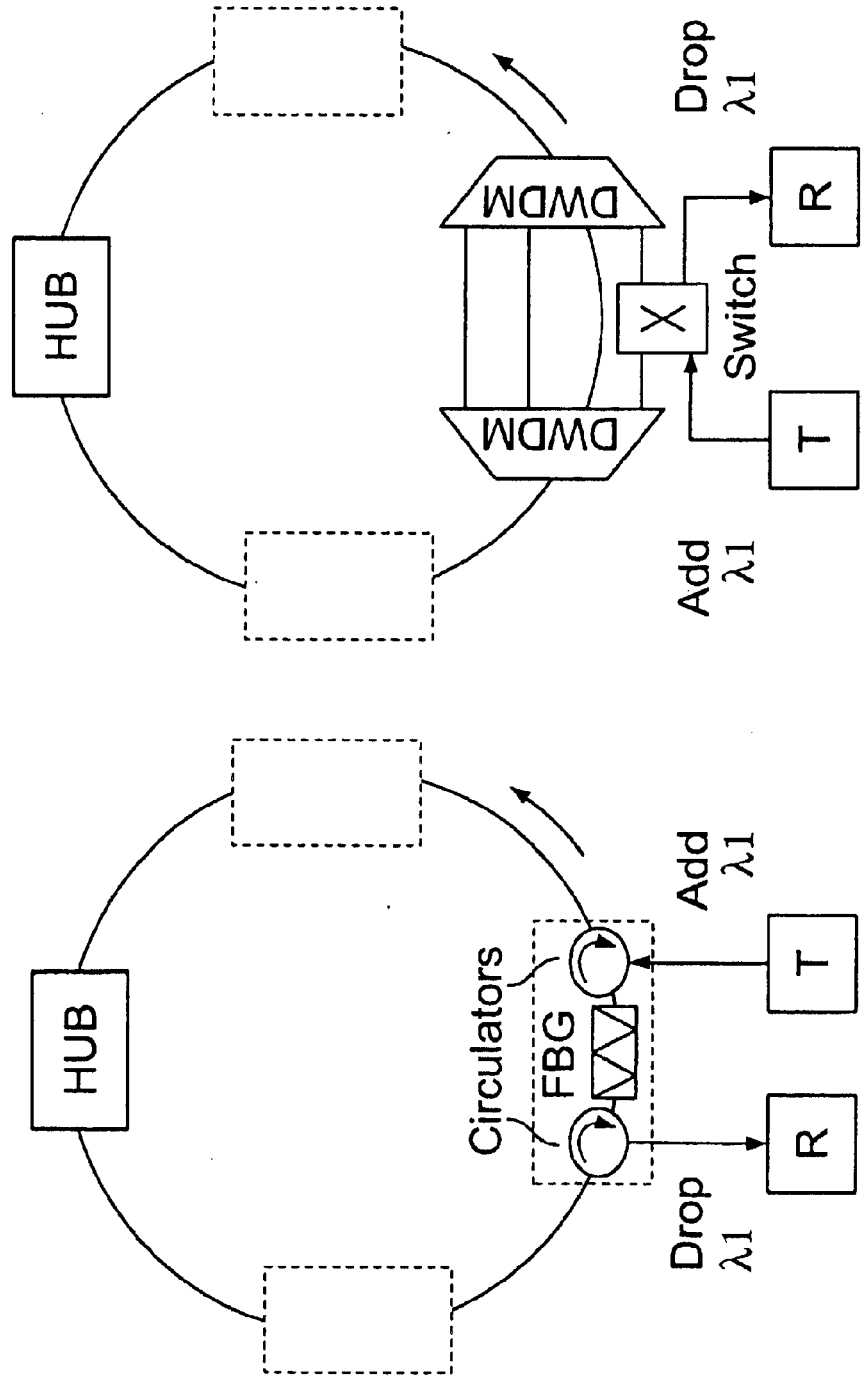
FIG. 1(a) is a schematic diagram of the conventional OADM that is placed in the main path of the ring network for OADM using Bragg grating.
FIG. 1(b) is a schematic diagram of the conventional OADM that is placed in the main path of the ring network for OADM using DWDM mux/demux and optical switches.
Figure 2:
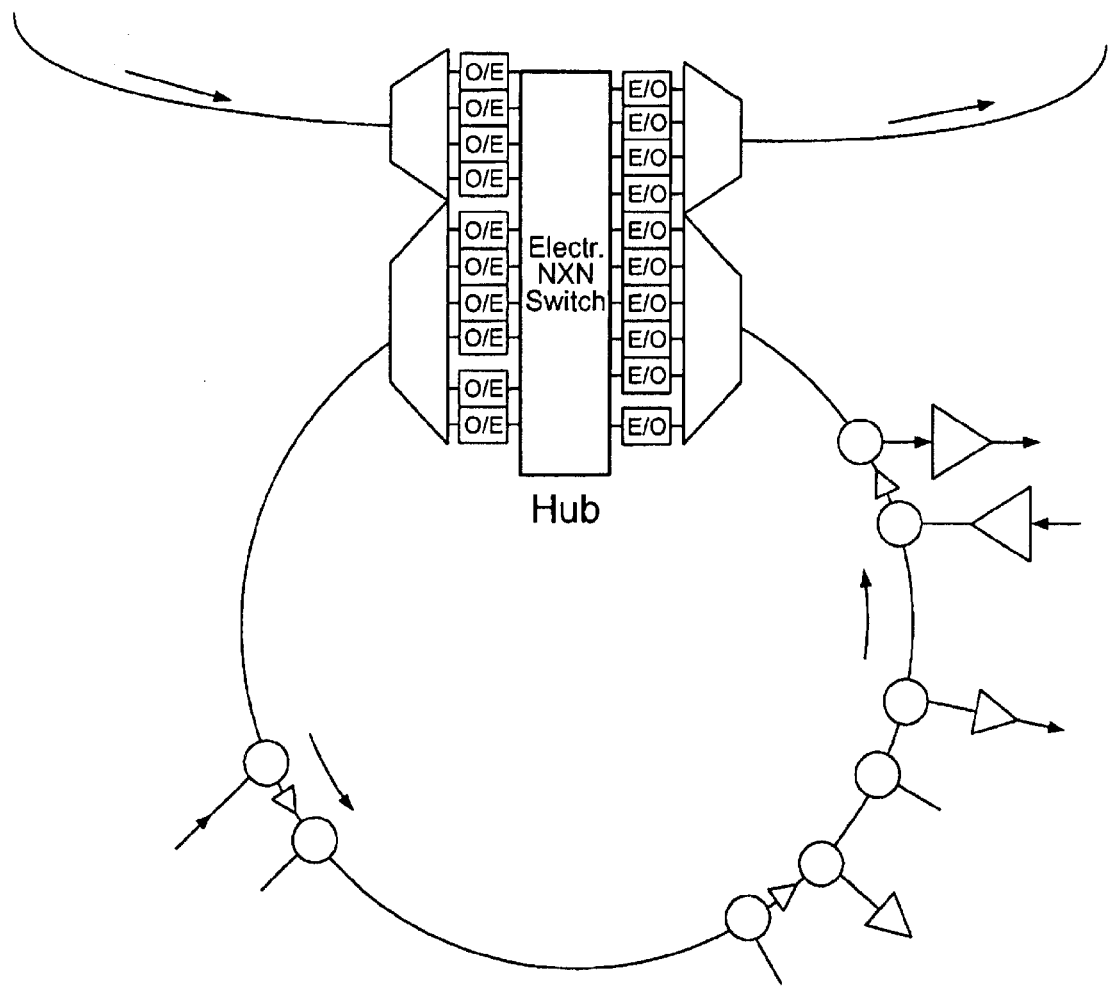
FIG. 2 illustrates a conventional central hub consisting of DWDM mux/demux and electronic N×N switches.

If optical amplifiers are used, the number of available wavelengths is dependent on the usable bandwidth of the amplifiers. The wider the amplifier gain bandwidth, the more wavelengths are available and no wavelength reuse is necessary. When broadband optical amplifiers are used in combination with ultra-dense WDM technology, as disclosed in U.S. patent application Ser. No. 09/575,811, dated May 22, 2000, incorporated herein by reference, the number of wavelengths that can be used is very large. It can be desirable to minimize or eliminate the use of active components such as optical amplifiers in order to enable the usage of a large number of wavelengths in a relatively short ring network as disclosed in U.S. Application No. 60/309, 220 filed Jul. 31, 2001 which is incorporated herein by reference. In one method of the present invention, the FIG. 2(a) ring network acts as a metropolitan passive optical network.

In one embodiment of the present invention, the available number of wavelengths is large enough and are transmitted over a long distance, including but not limited to over 1500 km of conventional single-mode fibers, and can cover multiple interconnected optical networks. In this embodiment, all of the wavelength converters and regenerators between optical networks are eliminated. Additionally, all of the wavelength-dependent OADMs within an optical ring network are also eliminated.

Figure 3B:
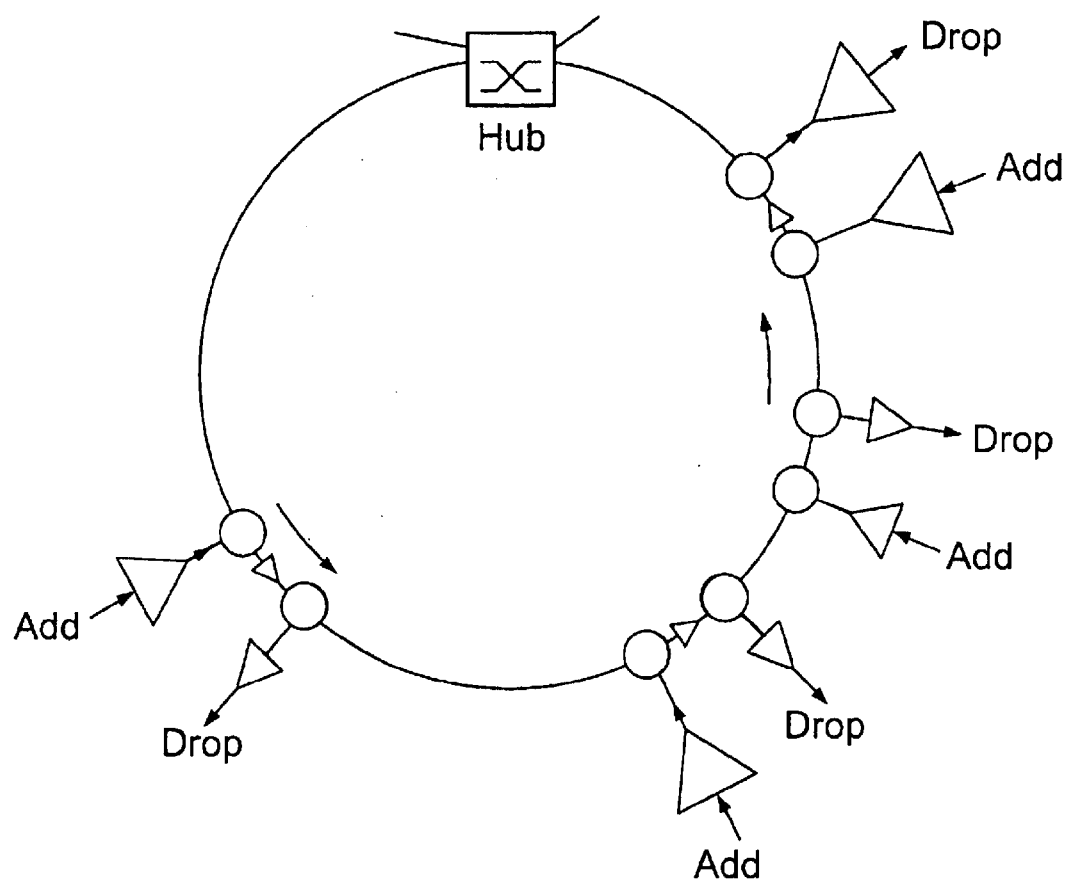
FIG. 3(b) is similar to FIG. 3(a), except that there are in-line amplifiers inserted between add and drop ports.

In FIG. 3(b), the all optical network has a large circumference, for example greater than 1500 km, and in-line optical amplifiers are added between the add and drop broadband couplers. The in-line optical amplifiers are gain-flattened and gain-equalized. Gain flattened for all wavelengths is used in order to achieve equal gain. Gain flattening is required in order to ensure that when the number of wavelengths on a ring changes, the available amplifier gain for each wavelength remains constant. It is not necessary to place the in-line optical amplifiers at every node in a ring. With this embodiment, the all optical network can be upgraded in capacity and the dynamic wavelength add-drop functionality is made easier because both of these functions can be carried out "off-line" without affecting the main path of the ring. The only limitation is that, due to the limited saturation power of an in-line amplifier, the total number of wavelengths traveling along the ring cannot be more than what an in-line amplifier can handle.

While the invention has been described in connection with what is presently considered to be the most practical and preferred embodiment, it is to be understood that the invention is not limited to the disclosed embodiment, but on the contrary it is intended to cover various modifications and equivalent arrangement included within the spirit and scope of the claims which follow.

What is claimed is:

1. A method of transmitting optical signal traffic, comprising:

providing an all optical network with at least two rings that are geographically dispersed, each ring including at least one transmitter and at least one receiver;

separating the available wavelengths into distinct ring bands;

sharing the optical signal traffic throughout the entire optical network;

providing each ring with its own distinct ring band of the optical signal traffic, wherein all of the optical signal traffic is transmittable throughout the optical network and each receiver is configured to receive only wavelengths in a ring band designated for its associated ring; and providing each receiver with a hierarchical mechanism to separate received light at different signal wavelengths within a designated ring band into a plurality of separate optical signals each having a plurality of signal channels and to filter each separate optical signal to extract a selected signal channel.

2. The method of claim 1, wherein all of the ring bands have a same number of optical signals.

3. The method of claim 1, wherein at least a portion of the ring bands have a same number of optical signals.

4. The method of claim 1, wherein all of the ring bands have a different number of optical signals.

5. The method of claim 1, wherein at least a portion of the ring bands have different numbers of optical signals.

6. The method of claim 1, wherein none of the ring bands shares a common wavelength with another ring band.

7. The method of claim 1, wherein all of the optical network traffic is included in the ring bands.

8. The method of claim 1, wherein each ring includes at least two nodes.

9. The method of claim 8, wherein each node includes at least one transmitter and one receiver.

10. The method of claim 1, wherein each ring in the optical network includes at least a first and a second fiber with all of the optical signal traffic traveling in both of the first and second fibers, wherein the optical signal traffic travels in a clockwise direction in the first fiber and in a counter-clockwise direction in the second fiber.

11. The method of claim 10, wherein the first and second fibers are each coupled to a 1×1 or 1×2 switch.

12. The method of claim 11, further comprising:

maintaining the 1×1 or 1×2 switch in an open position when there is no break point in an associated ring, and closing the 1×1 or 1×2 switch upon an occurrence of a break point in the associated ring.

13. The method of claim 12, further comprising:

discovering a break point in an ring by monitoring an optical supervision signal that travels through the associated ring.

14. The method of claim 10, wherein at least one of the two rings comprises a central hub optically coupled to the first and second fibers to include a first hub optical switch in the first fiber and a second hub optical switch in the second fiber, the method further comprising:

opening the first hub optical switch to create a break point when there is no other break point in the first fiber; and closing the first hub optical switch when there is a break point in the first fiber.

15. The method of claim 10, wherein at least one of the two rings comprises a central hub optically coupled to the first and second fibers to include a first hub optical switch in the first fiber and a second hub optical switch in the second fiber, the method further comprising:

operating each of the first and second hub optical switches to maintain a break point in each of the first and second fibers.

16. The method of claim 10, wherein at least one of the two rings comprises a central hub optically coupled to the first and second fibers to include a first hub optical switch in the first fiber and a second hub optical switch in the second fiber, and wherein the first fiber ring comprises as optical switch outside the central hub, the method further comprising:

opening the optical switch outside the central hub to maintain a break point in the first fiber when the first hub optical switch in the central hub is closed; and closing the first optical switch outside the central hub while keeping the first hub optical switch in the central hub closed when there is a break in the first fiber.

17. The method of claim 16, wherein the optical switch outside the central hub is located in a node coupled to the first and the second fibers.

18. The method of claim 1, wherein the optical network includes a 1×2 band-splitter and a 2×1 coupler that couples the optical signal traffic between the at least two rings.

19. The method of claim 18, further comprising:
coupling the optical signal traffic between the at least two rings through the 1×2 band-splitter and the 2×1 coupler.

20. The method of claim 1, wherein each ring in the optical network includes a fiber with the same signal traffic duplicated in two different bands that travel in both clockwise and counter-clockwise directions.

21. The method of claim 1, wherein the optical network includes, first, second and third rings, each ring including a first and a seond protection fibers with all of the optical signal traffic traveling in both of the first and second protection fibers, wherein the optical signal traffic travels in a clockwise direction in the first protection fiber and in a counter-clockwise direction in the second protection fiber.

22. The method of claim 21, wherein each of the first and second protection fibers is coupled to a 1×1 switch.

23. The method of claim 1, wherein the optical network further includes a first and second M×M optical switches, where M is the total number of ring bands.

24. The method of claim 23, further comprising:
coupling the optical signal traffic between the at least first and second rings with the first and second M×M switches, wherein the first M×M switch routes the optical signal traffic in a clockwise direction, and the second M×M switch routes the optical signal traffic in a counter-clockwise direction.

25. The method of claim 1, further comprising using a tunable laser in the at least one transmitter in each ring to launch a dynamically tunable wavelength into the optical network.

26. The method of claim 25, further comprising using a tunable optical filter in the at least one receiver in each ring to form a dynamic wavelength-tunable receiver.

27. The method of claim 1, further comprising using a tunable optical filter in the at least one receiver in each ring to form a dynamic wavelength-tunable receiver.

28. A method of transmitting optical traffic, comprising:
providing an all optical network with at least two rings that are geographically dispersed, each ring including at least one transmitter and at least one receiver;
sharing a sufficiently large enough number of wavelengths in the at least two rings to eliminate O-E-O conversions between the rings;
sharing the optical signal traffic throughout the entire optical network;
providing each ring with its own distinct ring band of the optical signal traffic, wherein all of the optical signal traffic is transmittable throughout the optical network and each receiver is configured to receive only wavelengths in a ring band designated for its associated ring; and
providing each receiver with a hierarchical mechanism to separate received light into a plurality of separate optical signals each having a plurality of channels and to filter each separate optical signal to extract a selected channel.

29. The method of claim 28, wherein all of the ring bands have a same number of optical signals.

30. The method of claim 28, wherein at least a portion of the ring bands have a same number of optical signals.

31. The method of claim 28, wherein all of the ring bands have a different number of optical signals.

32. The method of claim 28, wherein at least a portion of the ring bands have different numbers of optical signals.

33. The method of claim 28, wherein none of the ring bands shares a common wavelength with another ring band.

34. The method of claim 28, wherein all of the optical network traffic is included in the ring bands.

35. The method of claim 28, wherein each ring includes at least two nodes.

36. The method of claim 28, wherein each node includes at least one transmitter and one receiver.

37. The method of claim 28, wherein each ring in the optical network includes at least a first and a second fibers with all of the optical signal traffic traveling in both of the first and second fibers, wherein the optical signal traffic travels in a clockwise direction in the first fiber and in a counter-clockwise direction in the second fiber.

38. The method of claim 37, wherein the first and second fibers are each coupled to a 1×1 or 1×2 switch.

39. The method of claim 38, further comprising:
maintaining the 1×1 or 1×2 switch in an open position when there is no break point in an associated ring, and closing the 1×1 or 1×2 switch upon an occurrence of a break point in the associated ring.

40. The method of claim 39, further comprising:
discovering a break point in an ring by monitoring an optical supervision signal that travels through the associated ring.

41. The method of claim 28, wherein the optical network includes a 1×2 band-splitter and a 2×1 coupler that couples the optical signal traffic between the at least two rings.

42. The method of claim 41, further comprising:
coupling the optical signal traffic between the at least two rings through the 1×2 band-splitter and the 2×1 coupler.

43. The method of claim 28, wherein each ring in the optical network includes a fiber with the same signal traffic duplicated in two different bands that travel in both clockwise and counter-clockwise directions.

44. The method of claim 28, wherein the optical network includes, first, second and third rings, each ring including a first and a second protection fibers with all of the optical signal traffic traveling in both of the first and second protection fibers, wherein the optical signal traffic travels in a clockwise direction in the first protection fiber and in a counter-clockwise direction in the second protection fiber.

45. The method of claim 44, wherein each of the first and second protection fibers is coupled to a 1×1 switch.

46. The method of claim 28, wherein the optical network further includes a first and second M×M optical switches, where M is the total number of ring bands.

47. The method of claim 46, further comprising:
coupling the optical signal traffic between the at least first and second rings with the first and second M×M switches, wherein the first M×M switch routes the optical signal traffic in a clockwise direction, and the second M×M switch routes the optical signal traffic in a counter-clockwise direction.

48. A method of transmitting optical signal traffic, comprising:
providing an all optical network with hierarchical rings, each hierarchical ring including a plurality of nodes and each node including at least one transmitter and one receiver;

separating the optical signal traffic into ring bands;

transmitting the optical signal traffic through all of the hierarchical rings; and providing each hierarchical ring with its own distinct ring band, wherein all of the available wavelengths are transmittable throughout each hierarchical ring, and the receivers of a hierarchical ring are configured to receive only wavelengths in a ring band that is designated for that hierarchical ring.

49. The method of claim 48, further comprising using a tunable laser in the at least one transmitter in a node to launch a dynamically tunable wavelength into the optical network.

50. The method of claim 49, further comprising using a tunable optical filter in the at least one receiver in at least one of the nodes to form a dynamic wavelength-tunable receiver.

51. The method of claim 48, further comprising using a tunable optical filter in the at least one receiver in one node to form a dynamic wavelength-tunable receiver.

52. An all optical network for optical signal traffic, comprising:

at least a first and a second ring, each ring having at least one transmitter and one receiver and its own distinct ring band of the optical signal traffic, wherein all of the optical signal traffic is transmittable throughout the entire all optical network and each receiver is configured to receive only wavelengths in a ring band designated for its associated ring; and a central hub that couples the at least first and second rings, the central hub separating the optical signal traffic into ring bands, wherein each receiver in each ring comprises a hierarchical mechanism which comprises at least one optical element operable to separate received light into a plurality of separate optical signals each having a plurality of signal channels, and a plurality of optical filters optically coupled to receive and filter the separate optical signals, respectively, to extract respective selected signal channels.

53. The all optical network of claim 52, wherein each ring includes at least a first and a second protection fibers that carry all of the optical signal traffic, wherein the optical signal traffic travels in a clockwise direction in the first protection fiber and in a counter-clockwise direction in the second protection fiber.

54. The all optical network of claim 53 wherein at least one 1×1 or 1×2 switch is coupled to each of the first and second protection fibers.

55. The all optical network of claim 54, wherein each 1×1 or 1×2 switch is maintained in an open position when there is no break point in an associated ring, and each 1×1 or 1×2 switch is closed upon an occurrence of a break point in the associated ring.

56. The all optical network of claim 52, wherein the central hub includes at least one 1×2 band-splitter and a 2×1 coupler that couple the optical signal traffic between the at least first and second rings.

57. The all optical network of claim 52, further comprising: first and second M×M optical switches, where M is the total number of ring bands.

58. The all optical network of claim 52, wherein each ring includes multiple nodes.

59. The all optical network of claim 58, wherein each node includes at least one transmitter and one receiver.

60. The all optical network of claim 52, further comprising:

at least one mesh-based long haul network coupled to the at least first and second rings.

61. The all optical network of claim 52, wherein the at least first and second rings are geographically dispersed.

62. The all optical network of claim 52, wherein the at least first and second rings are hierarchical rings.

63. The all optical network of claim 52, wherein each of the at least first and second rings includes a 2×1 coupler for adding traffic and a 1×2 coupler for dropping traffic.

64. The all optical network of claim 63, further comprising:

a broadband gain-equalizer and a gain-clamped optical amplifier positioned between the first 2×1 coupler and the second 1×2 coupler of the at least first and second rings.

65. The all optical network of claim 52, wherein all of the ring bands have a same number of optical signals.

66. The all optical network of claim 52, wherein at least a portion of the ring bands have a same number of optical signals.

67. The all optical network of claim 52, wherein all of the ring bands have a different number of optical signals.

68. The all optical network of claim 52, wherein at least a portion of the ring bands have different numbers of optical signals.

69. The all optical network of claim 52, wherein none of ring bands share common wavelengths.

70. The all optical network of claim 52, wherein all of the optical network traffic is included in the ring bands.

* * * * *